(12) United States Patent
Östergaard et al.

(10) Patent No.: US 8,958,364 B2
(45) Date of Patent: Feb. 17, 2015

(54) HARQ HANDLING AT RELAY NODE RECONFIGURATION

(75) Inventors: Jessica Östergaard, Stockholm (SE);
Christian Hoymann, Aachen (DE);
Magnus Lindström, Sollentuna (SE);
Riikka Susitaival, Helsinki (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 442 days.

(21) Appl. No.: 13/372,739

(22) Filed: Feb. 14, 2012

(65) Prior Publication Data

US 2012/0230245 A1 Sep. 13, 2012

Related U.S. Application Data

(60) Provisional application No. 61/442,483, filed on Feb. 14, 2011.

(51) Int. Cl.
*H04W 4/00* (2009.01)
*H04W 72/04* (2009.01)
*H04W 84/04* (2009.01)

(52) U.S. Cl.
CPC ........ *H04W 72/0426* (2013.01); *H04W 84/047* (2013.01)
USPC ............................ 370/328; 370/329; 370/310

(58) Field of Classification Search
USPC ......................................... 370/328, 329, 310
See application file for complete search history.

(56) References Cited

U.S. PATENT DOCUMENTS

| | | | | |
|---|---|---|---|---|
| 8,289,895 B2* | 10/2012 | Yu et al. | ......................... | 370/315 |
| 8,428,607 B2* | 4/2013 | Nan | ........................... | 455/452.1 |
| 8,649,281 B2* | 2/2014 | Nam et al. | ..................... | 370/252 |
| 2006/0092973 A1* | 5/2006 | Petrovic et al. | ............... | 370/469 |
| 2009/0313518 A1* | 12/2009 | Shen et al. | ..................... | 714/749 |
| 2010/0103860 A1* | 4/2010 | Kim et al. | ..................... | 370/315 |

(Continued)

FOREIGN PATENT DOCUMENTS

| EP | 2 421 299 A1 | 2/2012 |
|---|---|---|
| EP | 2 424 288 A1 | 2/2012 |

(Continued)

OTHER PUBLICATIONS

3G Evolution: HSPA and LTE for Mobile Broadband, $2^{nd}$ Edition, Oct. 2008, p. 300.

(Continued)

*Primary Examiner* — Ricky Ngo
*Assistant Examiner* — Dewanda Samuel
(74) *Attorney, Agent, or Firm* — Baker Botts, LLP

(57) ABSTRACT

A radio access network comprises a donor base station node (29) and a relay base station node (20). The relay base station node (29) participates in communications across a first radio interface with a wireless terminal (30) and also participates in communications over a backhaul link across a second radio interface, the second radio interface reusing at least some functionality of the first interface. The donor base station node (28) configures a subframe configuration pattern. The subframe configuration pattern is arranged to specify which subframe(s) of a frame structure may be utilized for the backhaul link. As a result of subframe configuration, a HARQ process state in a HARQ process at one of the base station nodes is known by the other base station node by any of several operational modes.

39 Claims, 10 Drawing Sheets

(56) References Cited

U.S. PATENT DOCUMENTS

| | | |
|---|---|---|
| 2010/0169732 A1 | 7/2010 | Wu |
| 2010/0169733 A1 | 7/2010 | Kim et al. |
| 2010/0281323 A1* | 11/2010 | Wang et al. .................. 714/748 |
| 2011/0099447 A1 | 4/2011 | Park et al. |

FOREIGN PATENT DOCUMENTS

| | | |
|---|---|---|
| WO | 2010/118705 A1 | 10/2010 |
| WO | 2010/121539 A1 | 10/2010 |
| WO | 2012/110957 A1 | 8/2012 |

OTHER PUBLICATIONS

3GPP TS 36.216 V10.10; $3^{rd}$ Generation Partnership Project; Technical Specification Group Radio Access Network; Evolved Universal Terrestrial Radio Access (E-UTRA); Physical Layer for Relaying Operation (Release 10) (Dec. 2010).

3GPP TS 36.321 V10.0.0; $3^{rd}$ Generation Partnership Project; Technical Specification Group Radio Access Network; Evolved Universal Terrestrial Radio Access (E-UTRA); Medium Access Control (MAC) Protocol Specification (Release 10) (Dec. 2010).

3GPP TS 36.331 V10.0.0; $3^{rd}$ Generation Partnership Project; Technical Specification Group Radio Access Network; Evolved Universal Terrestrial Radio Access (E-UTRA); Radio Resource Control (RRC); Protocol Specification (Release 10) (Dec. 2010).

Chiu et al, "A Fast Retransmission Technology for the 3GPP Long-Term Evolution", Taiwan-Japan Joint Conference on Communications Technology, 2007, pp. 41-45.

International Search Report and Written Opinion mailed May 16, 2012 in PCT Application No. PCT/IB2012/050674.

Dahlman et al, "Retransmission Protocols", 4G LTE/LTE-Advanced for Mobile Broadband, chapter 12, pp. 247-264, 2011.

\* cited by examiner

Figure 5. Backhaul transmission using MBSFN subframes.

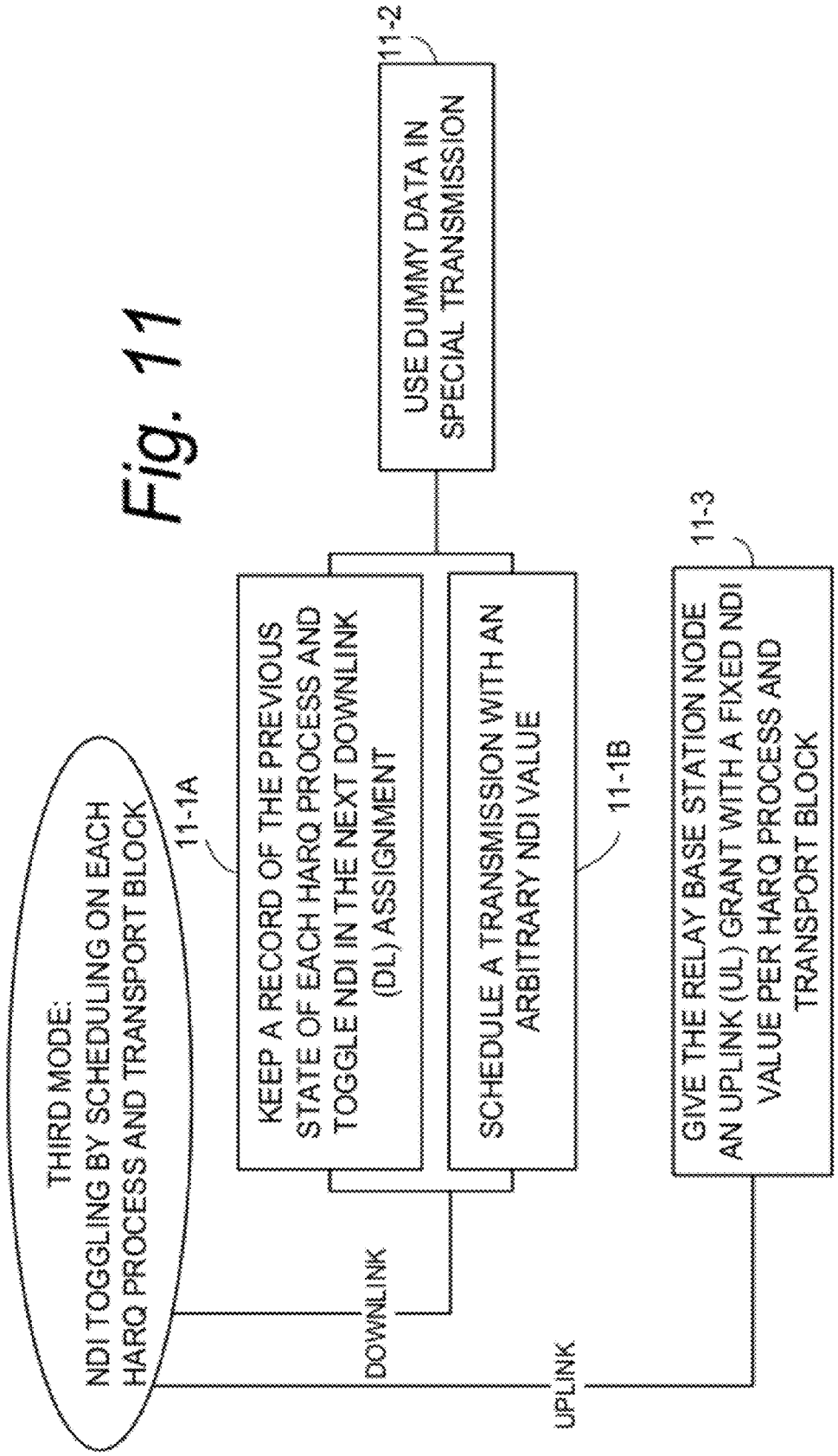

HARQ HANDLING AT RELAY NODE RECONFIGURATION

This application claims the benefit of and is related to U.S. Provisional Patent application 61/442,483, filed Feb. 14, 2011, entitled MAC HANDLING AT RN RECONFIGURATION, which is incorporated herein by reference in its entirety.

TECHNICAL FIELD

This invention pertains to telecommunications, and particularly to method and apparatus for handling relay base station nodes of a radio access network, including the operation of HARQ processes of a relay base station node in conjunction with a relay node (RN) subframe configuration.

BACKGROUND

In a typical cellular radio system, wireless terminals (also known as mobile stations and/or user equipment units (UEs)) communicate via a radio access network (RAN) to one or more core networks. The radio access network (RAN) covers a geographical area which is divided into cell areas, with each cell area being served by a base station, e.g., a radio base station (RBS), which in some networks may also be called, for example, a "NodeB" (UMTS) or "eNodeB" (LTE). A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units (UE) within range of the base stations.

In some versions of the radio access network, several base stations are typically connected (e.g., by landlines or microwave) to a controller node (such as a radio network controller (RNC) or a base station controller (BSC)) which supervises and coordinates various activities of the plural base stations connected thereto. The radio network controllers are typically connected to one or more core networks.

The Universal Mobile Telecommunications System (UMTS) is a third generation mobile communication system, which evolved from the second generation (2G) Global System for Mobile Communications (GSM). UTRAN is essentially a radio access network using wideband code division multiple access for user equipment units (UEs). In a forum known as the Third Generation Partnership Project (3GPP), telecommunications suppliers propose and agree upon standards for third generation networks and UTRAN specifically, and investigate enhanced data rate and radio capacity.

The Evolved Universal Terrestrial Radio Access Network (E-UTRAN) comprises the Long Term Evolution (LTE) and System Architecture Evolution (SAE). Long Term Evolution (LTE) is a variant of a 3GPP radio access technology wherein the radio base station nodes are connected to a core network (via Access Gateways, or AGWs) rather than to radio network controller (RNC) nodes. In general, in LTE the functions of a radio network controller (RNC) node are distributed between the radio base stations nodes (eNodeB's in LTE) and AGWs. As such, the radio access network (RAN) of an LTE system has an essentially "flat" architecture comprising radio base station nodes without reporting to radio network controller (RNC) nodes.

In conjunction with Long Term Evolution (LTE) the use of relay base station nodes is described, e.g., in 3GPP LTE Rel-10. As shown in FIG. 1, a relay base station node (RN) communicates over the radio or air interface (e.g., the Uu interface) with one or more wireless terminals, and over an interface known as the Un interface with a donor base station node, e.g., a donor dNodeB. Thus, transmissions between UE and relay are done over the radio interface denoted Uu, which is the same as for regular eNB to UE communication. Such being the case, from a UE perspective a relay appears a regular eNB. Between the relay and the eNB, transmissions are performed over a radio interface denoted Un, which reuses much of the functionality of the Uu interface. This means that the DeNB handles the relay as a UE using the same protocols as when communicating with a UE, with some additions.

In general, a relay node (RN)) has the following characteristics:

The relay node (RN) controls cells, each of which appears to a UE as a separate cell distinct from the donor cell The cells have their own Physical Cell ID (defined in LTE Rel-8) and the relay node shall transmit its own synchronization channels, reference symbols, . . . .

The UE receives scheduling information and HARQ feedback directly from the relay node and send its control channels (SR/CQI/ACK) to the relay node The presence and function of the relay node (RN) does not impact UEs. Moreover, all legacy LTE UEs can be served by the relay cell.

If the transmissions on the Un interface and the Uu interface (e.g., in the relay cell) are performed within the same frequency band, the relays are referred to as "inband relays". In case the transmissions are on a separate frequency band, the relays are referred to as outband relays.

Transmissions over the Un interface and the Uu interface typically occur in frames. Each frame usually comprises plural subframes. A subframe may comprise a signaling portion and a data portion, with the data portion often being used to include or transmit, among other things, one or more data transport blocks, or simply "transport blocks" (TBs). In general, once a HARQ process has acknowledged successful reception of a transport block, the next transport block is prepared by the sending node and is then subject to HARQ processing.

To enable inband relays to be functional, the relay base station node should not transmit and receive at the same time on the same frequency as the donor base station node, since this could cause severe (self) interference. To preclude such same-time transmission and attendant interference, transmissions over the backhaul link (over the Un interface) and the access links (over the Uu interface) are time multiplexed in a manner intended to avoid interference. In this regard, the donor base station node configures, via a Radio Resource Control (RRC) procedure called "RN reconfiguration" (relay node reconfiguration), a so-called "RN subframe configuration" (relay node subframe configuration) in the relay base station node, which governs, among other things, which subframes are used for the backhaul link.

The subframes that can be used for backhaul communication (e.g., across the Un interface) are referred to as the "subframe configuration pattern". The subframe configuration pattern may be communicated or signaled by the Radio Resource Control (RRC) protocol. For example, a change of a subframeConfigPattern information element or parameter in a message or signal generated by the RRC protocol may be used to communicate the subframe configuration pattern. The subframeConfigPattern parameter is defined, e.g., in 3GPP TS 36.331, section 6.3.2., as "RN-SubframeConfig", and is a parameter which may differ for FDD (an 8-bit bitmap) and TDD (an integer).

For Frequency Division Duplex (FDD), the subframe configuration pattern is a bitmap, which together with the MultiMedia Broadcast over a Single Frequency Network (MBSFN) configurability in the RN cell, specified which downlink (DL) subframes that are configured for backhaul communication. Uplink (UL) subframes for backhaul communication are derived from the DL subframes for backhaul communication such that there is an UL backhaul subframe n if subframe n−4 were a DL backhaul subframe.

For Time Division Duplex (TDD), the subframe configuration pattern is an index referring to an explicitly specified subframe pattern in the 3GPP specification 3GPP TS 36.216, "Evolved Universal Terrestrial Radio Access (E-UTRA); Physical layer for relaying operation," v.10.1.0 (the "36.216 Specification"), which is incorporated herein by reference in its entirety, specifying both DL and UL backhaul subframes.

For the downlink, to enable the relay to not transmit anything in its own cell (on the Uu interface) during the subframes used for the backhaul link (Un), the relay cell configures these subframes as MBSFN subframes. During an MBSFN subframe, the UEs in the relay cell do not expect to receive any cell-specific reference signals from the relay beyond what is transmitted in the first one or two Orthogonal Frequency Division Multiplexing (OFDM) symbols of the subframe. The relay node not scheduling any data in these subframes enables the relay node to listen to the downlink transmissions on the Un interface during the rest of these subframes (which are hence used for carrying downlink data from the donor base station node to the relay base station nodes). Conversely, subframes not configured for backhaul communication are used in the relay cell, and not used for the backhaul link. The donor base station node knows that these subframes are not available for backhaul communication and hence does not schedule the relay base station node An example of time division between the Un and Uu interfaces is illustrated in FIG. 2. For example, FIG. 2 shows a series of blocks representing subframes, with shaded ones of the subframes being MBSFN subframes. FIG. 2 thus depicts the time multiplexed downlink (DL) transmissions on the Un interface from the donor base station node to the relay base station node (such transmissions being represented by the arrows above the blocks in FIG. 2) and the transmissions on the Uu interface from the relay base station node to a wireless terminal (such transmissions being represented by the arrows below the blocks of FIG. 2).

In Long Term Evolution (LTE), all regular data transmissions between a base station node and a wireless terminal, whether between a donor base station node (e.g., a dNB) and a wireless terminal or between a relay base station node (RN) and a wireless terminal, are protected by a process known as Hybrid Automatic Repeat request (HARQ). In the wireless terminal and the eNB/RN, respectively, there are a number of HARQ processes available for the downlink (DL), and a number of HARQ processes available for the uplink (UL).

Each HARQ process typically is assigned or associated with a HARQ process number. The downlink (DL) HARQ process number is part of the downlink (DL) assignment so it does not have to depend on the subframe number, e.g., is not necessarily correlated with and can even be independent of the subframe number. The uplink (UL) HARQ process number is mapped to subframes according to the 3GPP TS 36.216 standard (section 7.3).

Moreover, each HARQ process has a HARQ process "state". As used herein, "HARQ process state" refers to contents of a buffer and value of at least one state variable or parameter, including a variable or parameter known as the New Data Indicator (NDI). The NDI parameter is a 1-bit value that is maintained for each HARQ process. In terms of a downlink (DL) HARQ process in the relay base station node, the HARQ process state comprises or is associated with a soft buffer which includes current soft-decoded information and the NDI. For an uplink (UL) HARQ process, the HARQ process state in the relay base station node comprises or is associated with a buffer for a MAC PDU to be transmitted and state variables, including the NDI and optionally including other variables such as the number of times a MAC PDU has been transmitted, current redundancy version and HARQ feedback. The downlink (DL) HARQ process in the donor base station node is the sending process, and hence is similar to the UL HARQ process in the relay node. In like manner, the uplink (UL) HARQ process in the donor base station node is similar to the downlink (DL) HARQ process in the relay base station node.

In the DL, the HARQ process number and the New Data Indicator (NDI) are signaled explicitly as two separate variables. The network signals if a transmission is a new transmission or a retransmission through or by the NDI. The NDI (being a 1-bit indicator) is/may be considered to be toggled (new transmission) or not toggled (retransmission) compared to its previous value.

In the uplink (UL), the HARQ process number is instead derived from the subframe in which it is, and the same HARQ process is tied to subframe n, n+8, n+16, etc. The concept of an NDI is also used in the uplink (UL) in essentially the same way as in the downlink (DL).

In view of the foregoing it will be understood that, for a relay base station node with an RN subframe configuration, only a subset of the subframes is available for transmissions on the backhaul link. This means fewer HARQ processes are needed. A number of HARQ processes are specified in the 3GPP TS 36.216 Specification already referenced above. These HARQ processes are laid out on the subframes available for backhaul transmissions, and used so that retransmissions are synchronous with respect to the HARQ process.

There are times at which the subframe configuration is changed by the donor base station node. When the subframe configuration is changed, the change may affect (e.g., also change) one or both of (1) the number of HARQ processes (e.g., the number of HARQ processes used on the uplink (UL) over the Un interface and (2) a mapping of HARQ processes to subframes.

Earlier releases of Long Term Evolution (LTE) do not contemplate a change in the number of HARQ process, and thus heretofore ramifications of such change have been unappreciated and not addressed. Thus, with the introduction of a specific subframe configuration and its potential change, it is not clear from prior practice what may happen to any data which may be pending in HARQ buffers of the HARQ processes. This ambiguity or uncertainty can lead to a mismatch in the HARQ process state between the donor base station node and the relay base station node, and to data loss.

SUMMARY

In one of its aspects the technology disclosed herein concerns a method of operating a radio access network comprising a donor base station node and a relay base station node. The relay base station node participates in communications across a first radio interface with a wireless terminal and also participates in communications over a backhaul link across a second radio interface, the second radio interface reusing at least some functionality. In a basic embodiment and mode the method comprises configuring a subframe configuration pattern; and as a result thereof (e.g., to counter or address the consequences of the configuration of the subframe configuration pattern), making a HARQ process state in a HARQ process at one of the base station nodes known by the other base station node. The subframe configuration pattern is arranged to specify which subframe(s) of a frame structure may be utilized for the backhaul link.

In an example embodiment and mode, the method further comprises making a HARQ process state in a HARQ process at the relay base station node known by the donor base station node and/or making a HARQ process state a the HARQ process at the donor base station node known by the relay base station node In an example embodiment and mode, the method further comprises using a processor to make the HARQ process state in the HARQ process at one of the base station nodes known by the other base station node In an example embodiment and mode, the method further comprises the act of configuring the subframe configuration pattern comprises re-configurating the subframe configuration pattern after a previous configuration of the subframe pattern. The re-configuring comprises changing a number of HARQ processes in at least one of the donor base station node or the relay station node and/or changing a mapping of HARQ processes to subframes of the frame structure. Making the HARQ process state in the HARQ process at one of the base station nodes known by the other base station node is performed in response to the re-configuring.

In an example embodiment and mode, making the HARQ process state in the HARQ process at one of the base station nodes known by the other base station node comprises: mapping a HARQ process executed at the donor base station node and a corresponding HARQ process executed at the relay base station node to one or more subframes; and, providing a value for a HARQ process state variable to the HARQ process executed at the donor base station node and to the corresponding HARQ process executed at the relay base station node.

In an example embodiment and mode, the HARQ process state variable comprises a new data indicator (NDI)

In an example embodiment and mode, making the HARQ process state in the HARQ process at one of the base station nodes known by the other base station node comprises performing a medium access control (MAC) reset procedure at least at the relay base station node.

In an example embodiment and mode, making the HARQ process state in the HARQ process at one of the base station nodes known by the other base station node comprises: flushing uplink HARQ buffers in the relay base station node; and either: considering a next received transmission of a transport block in the relay base station node as a new transmission; or flushing downlink HARQ buffers in the relay base station node. Considering the next received transmission of the transport block as the new transmission comprises either: setting a new data indicator (NDI) to a value which is toggled compared to a previously used NDI value for the transport block for the HARQ process; or considering the NDI to have been toggled compared to a previous transmission on the same transport block on the same HARQ process if a change in the subframe configuration pattern has occurred since the previous transmission.

In an example embodiment and mode, making the HARQ process state in the HARQ process at one of the base station nodes known by the other base station node comprises: for a downlink HARQ process, after the subframe configuration scheduling the relay base station node with a specified value of a new data indicator (NDI) on each downlink HARQ process corresponding to a toggling of the NDI from a last transmission on each HARQ process by first scheduling a first transmission with an NDI, and then scheduling a second transmission with an NDI which is toggled compared to the first transmission; for a uplink HARQ process, providing the wireless terminal with a first uplink grant and associating with the first uplink grant a new data indicator (NDI) value for the HARQ process and transport block and subsequently providing the wireless terminal with a second uplink grant associated with a new NDI value which is toggled compared to the first uplink (UL) grant NDI.

In an example embodiment and mode, the method further comprises using dummy data in the first transmission.

In an example embodiment and mode, for the downlink HARQ process scheduling the relay base station node with the specified value of the new data indicator (NDI) on each HARQ process comprises keeping a record of a previous state of each HARQ process and toggling the new data indicator (NDI) in a next downlink assignment.

In an example embodiment and mode, making the HARQ process state in the HARQ process at one of the base station nodes known by the other base station node comprises providing the HARQ process executed at the donor base station node and the corresponding HARQ process executed at the relay base station node with common knowledge of HARQ process mapping and HARQ process states. In an example implementation, providing the HARQ process executed at the donor base station node and the corresponding HARQ process executed at the relay base station node with common information of HARQ process mapping comprises providing common information regarding at least one of: mapping of HARQ process number to subframe(s); and, pre-configuration HARQ process number to post-configuration HARQ process number. In an example implementation, providing common information of HARQ process mapping and HARQ process states comprises the providing common information as predetermined information or as information signaled between the donor base station node and the relay base station node.

In an example embodiment and mode, the method further comprises reusing pre-configuration soft information stored in HARQ buffers of the HARQ processes after the configuration.

In an example embodiment and mode, if a number of HARQ processes in use after the configuration is less than a number of HARQ processes in use before the configuration whereby after the configuration at least one HARQ process is a superfluous HARQ process, the method further comprises: removing any superfluous downlink HARQ processes in a predetermined pattern; or for both uplink HARQ processes and downlink HARQ processes, prioritizing removal of HARQ processes that have no pending transmission.

In another of its aspect the technology disclosed herein concerns a donor base station node of a radio access network which participates in communications over a backhaul link across a radio interface with a relay base station. The donor base station node comprises a processor arranged: to configure a subframe configuration pattern and, in response to configuration of the subframe configuration pattern, to make a HARQ process state in a HARQ process at one of the base station nodes known by the other base station node. The subframe configuration pattern is arranged to specify which subframe(s) of a frame structure may be utilized for the backhaul link and which subframes(s) of the frame structure may be utilized for communications between the relay base station and a wireless terminal.

In an example embodiment the processor is configured to make a HARQ process state in a HARQ process at the relay base station node known by the donor base station node and/or make a HARQ process state a HARQ process at the donor base station node known by the relay base station node.

In an example embodiment the processor is arranged to configure the subframe configuration pattern as a re-configuration of the subframe configuration pattern after a previous configuration of the subframe pattern. The re-configuration comprises changing a number of HARQ processes in at least one of the donor base station node or the relay station node and/or changing a mapping of HARQ processes to subframes of the frame structure; and wherein the processor is configured to make the HARQ process state in the HARQ process at one of the base station nodes known by the other base station node in response to the re-configuration.

In an example embodiment the processor is configured to make the HARQ process state in the HARQ process at one of the base station nodes known by the other base station node by: mapping the HARQ process executed at the donor base station node and the corresponding HARQ process executed at the relay base station node to one or more subframes; and, providing a HARQ process state variable to the HARQ process executed at the donor base station node and the corresponding HARQ process executed at the relay base station node. In an example embodiment the HARQ process state variable comprises a new data indicator (NDI).

In an example embodiment the processor is configured to make the HARQ process state in the HARQ process at one of the base station nodes known by the other base station node by performing a medium access control (MAC) reset procedure.

In an example embodiment the processor is configured make the HARQ process state in the HARQ process at one of the base station nodes known by the other base station node by: for a downlink HARQ process, after the subframe configuration scheduling the relay base station node with a specified value of a new data indicator (NDI) on each downlink HARQ process corresponding to a toggling of the NDI from a last transmission on each HARQ process by first scheduling a first transmission with an NDI, and then scheduling a second transmission with an NDI which is toggled compared to the first transmission; for a uplink HARQ process, providing the wireless terminal with a first uplink grant and associating with the first uplink grant a new data indicator (NDI) value for the HARQ process and transport block and subsequently providing the wireless terminal with a second uplink grant associated with a new NDI value which is toggled compared to the first uplink (UL) grant NDI.

In an example embodiment the processor is configured to use dummy data in the first transmission.

In an example embodiment the processor is configured to schedule the relay base station node with the predetermined value of the new data indicator (NDI) on each HARQ process by keeping a record of a previous state of each HARQ process and toggling the new data indicator (NDI) in a next downlink assignment.

In an example embodiment the processor is configured to make the HARQ process state in the HARQ process at one of the base station nodes known by the other base station node by providing the HARQ process executed at the donor base station node and the corresponding HARQ process executed at the relay base station node with common knowledge of HARQ process mapping and HARQ process states.

In an example embodiment the processor is configured to provide common information regarding at least one of: mapping of HARQ process number to subframe(s); and pre-configuration HARQ process number to post-configuration HARQ process number.

In an example embodiment the processor is configured to re-use pre-configuration soft information stored in HARQ buffers of the HARQ processes after the configuration.

In an example embodiment, if a number of HARQ processes in use after the configuration is less than a number of HARQ processes in use before the configuration, the processor is configured to: remove downlink HARQ processes in a predetermined pattern; or for both uplink HARQ processes and downlink HARQ processes, prioritize removal of HARQ processes that have no pending transmission.

In another of its aspects the technology disclosed herein concerns a relay base station node of a radio access network which participates in communications over a backhaul link across a radio interface with a donor base station node. The relay base station node comprises a transceiver and a processor. The transceiver is configured to receive an indication of a change in a subframe configuration pattern, the subframe configuration pattern being arranged to specify which subframe(s) of a frame structure may be utilized for the backhaul link and which subframes(s) of the frame structure may be utilized for communications between the relay base station and a wireless terminal. The processor is configured, in response to the received indication, to make a HARQ process state in a HARQ process at one of the base station nodes known by the other base station node.

In an example embodiment the processor is configured to make a HARQ process state in a HARQ process at the relay base station node known by the donor base station node and/or make a HARQ process state a HARQ process at the donor base station node known by the relay base station node.

In an example embodiment the change in the subframe configuration pattern comprises changing a number of HARQ processes in at least one of the donor base station node or the relay station node and/or changing a mapping of HARQ processes to subframes of the frame structure.

In an example embodiment the processor is configured to perform at least the following for making the HARQ process state in the HARQ process at one of the base station nodes known by the other base station node: mapping the HARQ process executed at the donor base station node and a corresponding HARQ process executed at the relay base station node to one or more subframes; and, providing a value for a HARQ process state variable to the HARQ process executed at the donor base station node and to the corresponding HARQ process executed at the relay base station node.

In an example embodiment the HARQ process state variable comprises a new data indicator (NDI).

In an example embodiment the processor is configured to perform a medium access control (MAC) reset procedure at the relay base station node for making the HARQ process state in the HARQ process at one of the base station nodes known by the other base station node.

In an example embodiment the processor is configured to perform at least the following to make the HARQ process state in the HARQ process at one of the base station nodes known by the other base station node: flushing uplink HARQ buffers in the relay base station node; and either: considering a next received transmission of a transport block as a new transmission; or flushing downlink HARQ buffers in the relay base station node.

In an example embodiment, when considering the next received transmission of the transport block as the new transmission comprises the processor either: sets a new data indicator (NDI) to a value which is toggled compared to a previously used NDI value for the transport block for the HARQ process; or considers the NDI to have been toggled compared to a previous transmission on the same transport block on the same HARQ process if a change in the subframe configuration pattern has occurred since the previous transmission.

In an example embodiment the processor is provided with common knowledge of HARQ process mapping and HARQ process states. In an example embodiment the common information comprises at least one of: mapping of HARQ process number to subframe(s); and pre-configuration HARQ process number to post-configuration HARQ process number.

In an example embodiment the processor is configured to use pre-configuration soft information stored in HARQ buffers of the HARQ processes after the configuration.

In an example embodiment, if a number of HARQ processes in use after the configuration is less than a number of HARQ processes in use before the configuration, the processor is further configured to: remove downlink HARQ processes in a predetermined pattern; or for both uplink HARQ processes and downlink HARQ processes, prioritize removal of HARQ processes that have no pending transmission.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 11 is a diagrammatic view depicting example acts or steps comprising a third mode of implementation an act of the generic method of FIG. 8.

DETAILED DESCRIPTION

Figure 1:
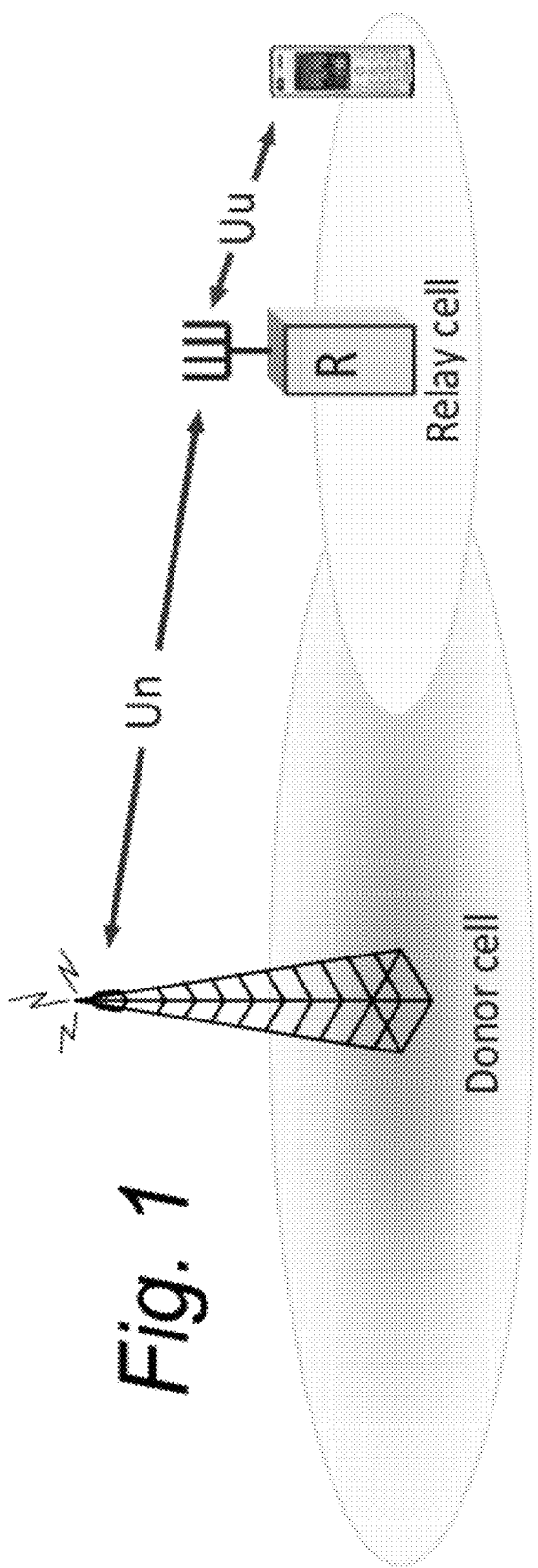
FIG. 1 is a diagrammatic view of portions of a radio access network including a donor base station node and a relay base station node.
Figure 2:
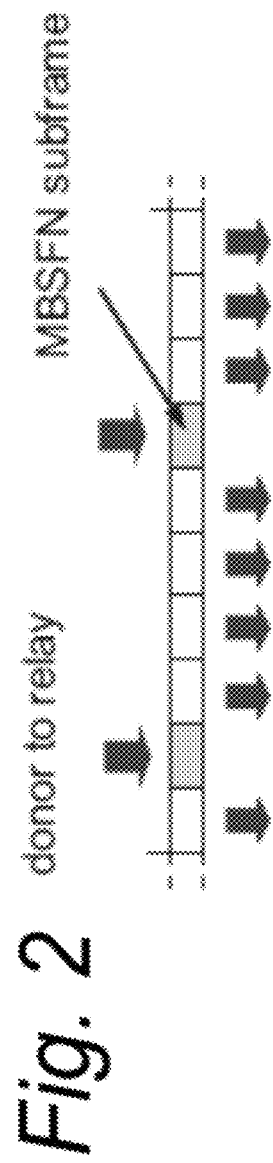
FIG. 2 is a diagrammatic illustration depicting an example time division of subframes between the Un and Uu interfaces of a radio access network such as that of FIG. 1.

In the following description, for purposes of explanation and not limitation, specific details are set forth such as particular architectures, interfaces, techniques, etc. in order to provide a thorough understanding of the present disclosure. However, it will be apparent to those skilled in the art that the present disclosure may be practiced in other embodiments that depart from these specific details. That is, those skilled in the art will be able to devise various arrangements which, although not explicitly described or shown herein, embody the principles of the present disclosure and are included within its spirit and scope. In some instances, detailed descriptions of well-known devices, circuits, and methods are omitted so as not to obscure the description of the present embodiments with unnecessary detail. All statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein may represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being hardware-implemented and/or computer-implemented, and thus machine-implemented.

In terms of hardware implementation, the functional blocks may include or encompass, without limitation, digital signal processor (DSP) hardware, reduced instruction set processor, hardware, e.g., digital or analog, circuitry including but not limited to application specific integrated circuit(s) (ASIC), and, where appropriate, state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Figure 3:
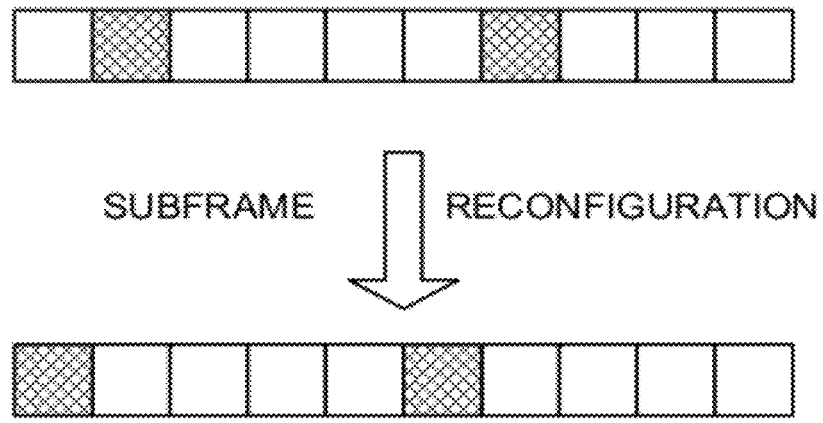
FIG. 3 and FIG. 4 are diagrammatic view of different example scenarios of changing a subframe configuration pattern.
Figure 4:
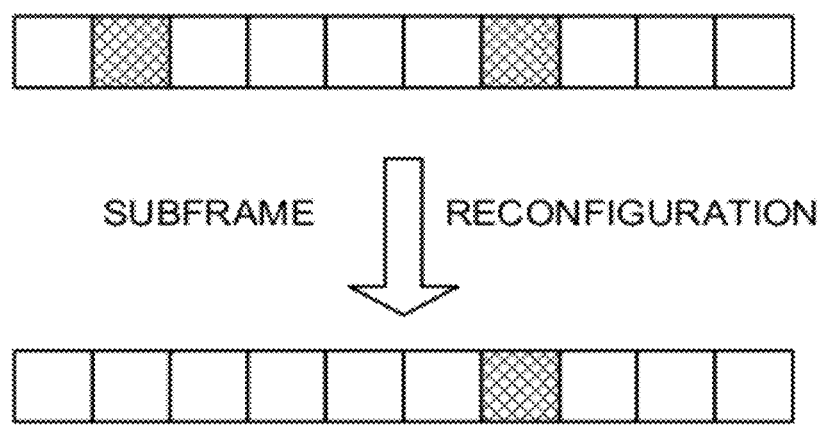

As mentioned above, a donor base station node may change a subframe configuration pattern, and thus change which subframes of a frame are used for the backhaul (e.g., over the Un interface). As different example scenarios, FIG. 3 and FIG. 4 illustrate with cross hatching certain subframes included in the subframe configuration pattern for use over the backhaul (e.g., the Un interface) both before and after two different subframe reconfiguration operations. In the first example scenario of FIG. 3, the donor base station node may change the subframe configuration pattern so that, although a same number of subframes are used over the backhaul (e.g., over the Un interface), there is a change in which particular subframes are utilized on the backhaul. In the second example scenario of FIG. 4, the donor base station node may change the subframe configuration pattern so as to change (e.g., increase or diminish) a number of subframes used over the backhaul. In the example of FIG. 4 the number of subframes used over the backhaul decreases from two to one. Other examples of changes in the subframe configuration pattern, such as adding more subframes to the subframe configuration pattern, are also possible. Thus, as a result of a change in the subframe configuration pattern, there may be a changed number (e.g., more or fewer) of HARQ processes, or the same number of HARQ processes but mapped to different subframes.

It is unclear in conventional practice what happens to the state of the HARQ processes when the HARQ processes in use are changed due to a (re)configuration of the subframe configuration pattern. Such unclarity regarding the state of the HARQ processes occurs both in the uplink (UL) and the downlink (DL).

In the downlink (DL), the HARQ process number is signaled explicitly. This means that if the HARQ processes change, the donor base station node is still in full control of which HARQ process is used in the relay base station node for a specific downlink (DL) assignment, as the donor base station node signals which HARQ process to use. However, the signaling for the new transmission/retransmission is done in terms of a toggled/non-toggled new data indicator (NDI), which hence depends on the previous state of the new data indicator. Without knowledge of the NDI state, the relay base station node may assume a retransmission when the transmission is an initial transmission, or vice versa.

In the uplink (UL), it will not be known between the donor base station node and relay base station node which HARQ process is in use in a particular subframe. As the HARQ processes may or may not have been in use before the subframe configuration pattern change, the donor base station node may receive an adaptive or non-adaptive retransmission from a non-empty HARQ buffer, filled before the subframe configuration pattern was changed. An adaptive retransmission would occur if the donor base station node grants the HARQ process with a non-toggled NDI. A non-adaptive retransmission would occur if the donor base station node does not grant the HARQ process at all. But there may be data in the buffer that has not been acknowledged as received. If such a retransmission happens (adaptive or non-adaptive), the donor base station node does not know which HARQ process this data is from; the donor base station node cannot map the received data to the correct receive buffer where the result of the decoding of the initial transmission and older retransmissions are stored; and the donor base station node may not be able to decode the data at all. This is especially the case when the retransmission is the transmission of a redundancy version which is not decodable on its own.

Thus, in both the downlink (DL) and the uplink (UL), the consequence of not knowing the HARQ process state is ambiguity at the receiving side. The receiver will not know if the transmission received is a new transmission or a retransmission. Thus, the receiver will also not know if the transmission should be soft combined with previously stored soft information, and if so, which particular soft information.

As explained below, the technology disclosed herein provides method and apparatus to ensure that the state of HARQ processes in use after the initial configuration or later reconfiguration of the subframe configuration pattern (subframe configuration pattern change, or change of the subframeConfigPattern parameter in RRC) is known in both the relay base station node and donor base station node. This can be achieved, at subframe configuration pattern change or after the change, before each individual HARQ processes is used again. This coordination of knowledge of the HARQ process states may be achieve using several different embodiments and modes, four general embodiments and modes being described subsequently here. Before describing the general embodiments and modes, discussion is first provided below (first with reference to FIG. 5 and then with reference to FIG. 6 and FIG. 7) regarding structural and other aspects of generic embodiments and modes.

Structure

Overview of Nodes

Figure 5:
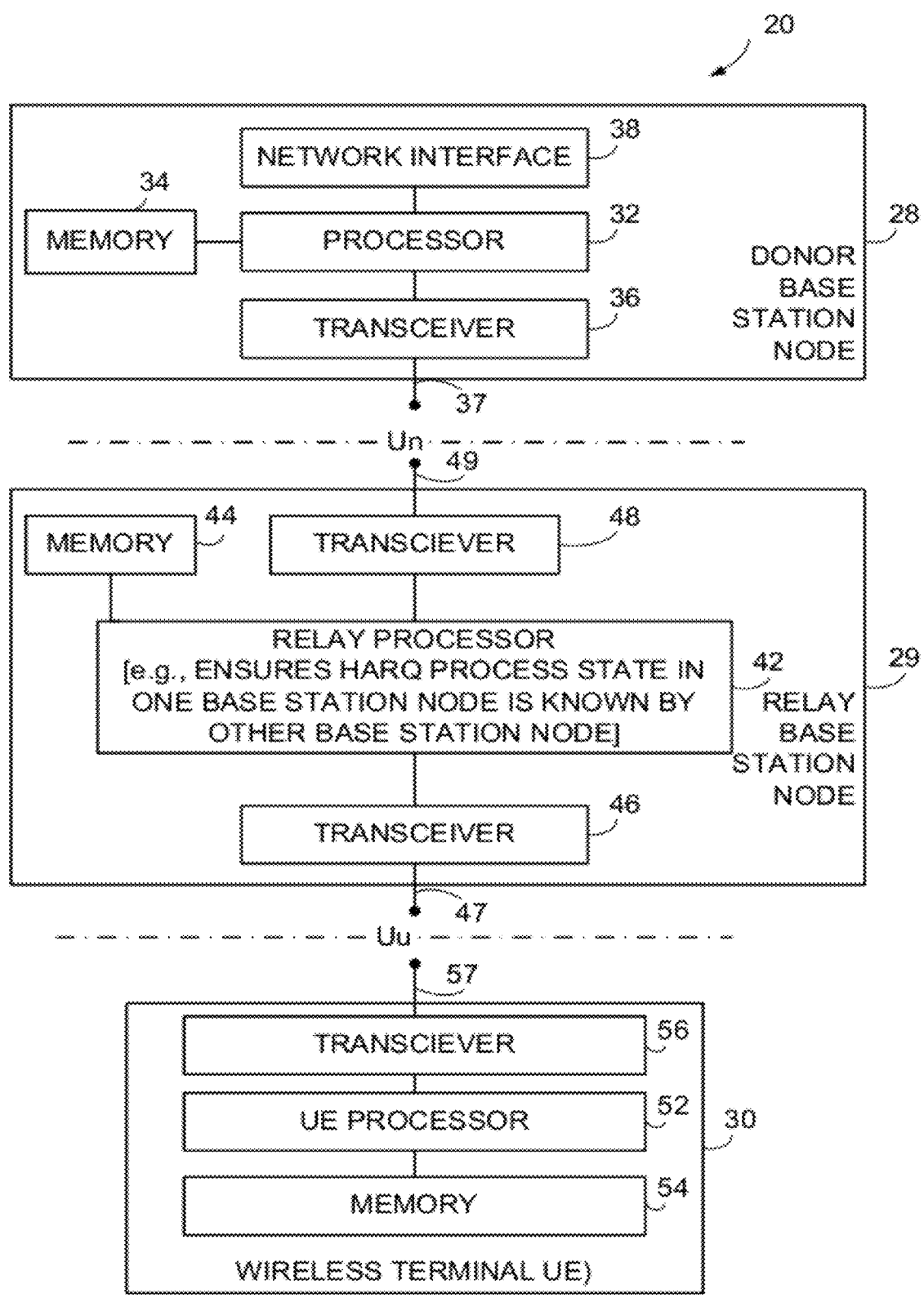
FIG. 5 is a schematic view of portions of a radio access network comprising a donor base station node and a relay base station node for illustrating context and environment for implementation and operation of embodiments and modes of the technology disclosed herein as well as basic example constituent functionalities and/or units of the nodes.

FIG. 5 shows portions of an example, representative embodiment of a radio access network 20 comprising donor base station node 28, relay base station node 29, and wireless terminal 30. The example network may include one or more instances of such a donor base station node 28 (e.g., a donor eNode B as shown in FIG. 1), the relay base station node 29, and the wireless terminal 30 along with any additional elements suitable to support communication between wireless terminals or between a wireless terminal and another communication device (such as a landline telephone).

As shown in FIG. 5, the example base station (e.g., donor base station node 28) includes processor 32, memory 34, transceiver 36, antenna 37, and network interface 38. The transceiver 36 and antenna 37 cooperate for performing, e.g., communications over the Un interface with relay base station node 29. The network interface 38 may connect to a core network. In particular embodiments, some or all of the functionality of donor base station node 28 as described herein may be provided by the processor 32 executing instructions stored on a computer-readable medium, such as non-transient instructions memory 34. Alternative embodiments of donor base station node 28 may include additional components responsible for providing additional functionality, including any of the functionality identified herein and/or any functionality necessary to support one or more of the solution(s) described herein.

The example relay base station node 29 of FIG. 5 comprises relay node processor 42; memory 44; one or more transceivers 46 and antennas 47 for communication across the Uu interface with one or more wireless terminals 30; and one or more transceivers 48 and antennas 49 for communication across the Un interface with donor base station node 28. Some or all of the functionality described above as being provided by donor base station node 28 may be provided by the relay processor 30 executing non-transient instructions stored on a computer-readable medium, such as memory 44. Alternative embodiments of relay base station node 29 may include additional components responsible for providing additional functionality, including any of the functionality identified herein and/or any functionality necessary to support one or more of the solution(s) described herein.

In different implementations of the technology disclosed herein, either one or both of the processor 32 of donor base station node 28 and the relay node processor 42 of relay base station node 29 serve to make a HARQ process state in a HARQ process at relay base station node 29 known by donor base station node 28 and/or make a HARQ process state in a HARQ process at the donor base station node 28 known by the relay base station node 29. Thus, the technology disclosed herein makes a HARQ process state in a HARQ process at one of the base station nodes known by the other base station node, e.g., by a HARQ process of the other base station node. For example, in one example implementation a HARQ process state in a HARQ process at the relay base station node 29 is made known to a HARQ process in the donor base station node 28. In a second example implementation a HARQ process state in a HARQ process at the donor base station node 28 is made known to a HARQ process in the relay base station node 29. In a third example implementation, the HARQ process states of the HARQ processes of donor base station node 28 and relay base station node 29 are mutually made known to each other.

The technology disclosed herein makes a HARQ process state in a HARQ process at one of the base station nodes known by the other base station node, e.g., by a HARQ process of the other base station node, and does so without hardwire or other physical (e.g., non-radio) interconnections between the donor base station node 28 and the relay base station node 29.

When a processor implements one or more actions to ensure that a HARQ process state of one base station node is "made known" to the other base station node, the processor seeks to ensure that post-configuration operation of the HARQ process(es) at one of the base station nodes is coordinated and compatible with post-configuration operation of the other base station node. For example, a processor of relay base station node 29 may seek to ensure one or more of its HARQ process states is/are coordinated and compatible with post-configuration operation of the donor base station node, e.g., of the HARQ process(es) in the donor base station node. For example, one or both of donor processor 32 and relay node processor 42 may implement one or more actions to render the HARQ process state of the HARQ process at the relay base station node 29 operationally compatible after the configuration with the HARQ process in the donor base station node 28. Rendering the HARQ process state of the HARQ process at one of the base station nodes "operationally compatible" after the configuration comprises, in various embodiments and modes described herein, means or involves adjusting contents of buffers of the HARQ process and values of the HARQ process state variables (e.g., NDI) such that such contents and values will be known or assumed known by the other base station node so that the HARQ processes of donor base station node 28 and relay base station node 29 may continue to operate in coordination and with successful decoding after the subframe configuration.

In its basic form the example wireless terminal (UE) 30 of FIG. 5 comprises processor 52; memory 54; transceiver 56; and one or more antenna 57. Some or all of the functionality described herein as being provided by wireless terminal 30, by mobile communication devices or other forms of UE may be provided by the UE processor 52 executing non-transient instructions stored on a computer-readable medium, such as memory 54. Alternative embodiments of the UE may include additional components beyond those shown in FIG. 5 that may be responsible for providing certain aspects of the functionality of the wireless terminal 30, including any of the functionality described herein and/or any functionality necessary to support one or more of the solution(s) described herein.

The wireless terminal 30 may be called by other names and comprise different types of equipment. For example, the wireless terminal may also be called a mobile station, wireless station, or user equipment unit (UE), and may be equipment such as a mobile telephone ("cellular" telephone) and a laptop with mobile termination, and thus may be, for example, portable, pocket, hand-held, computer-included, or car-mounted mobile devices which communicate voice and/or data with radio access network.

Structure

HARQ Aspects

Figure 6:
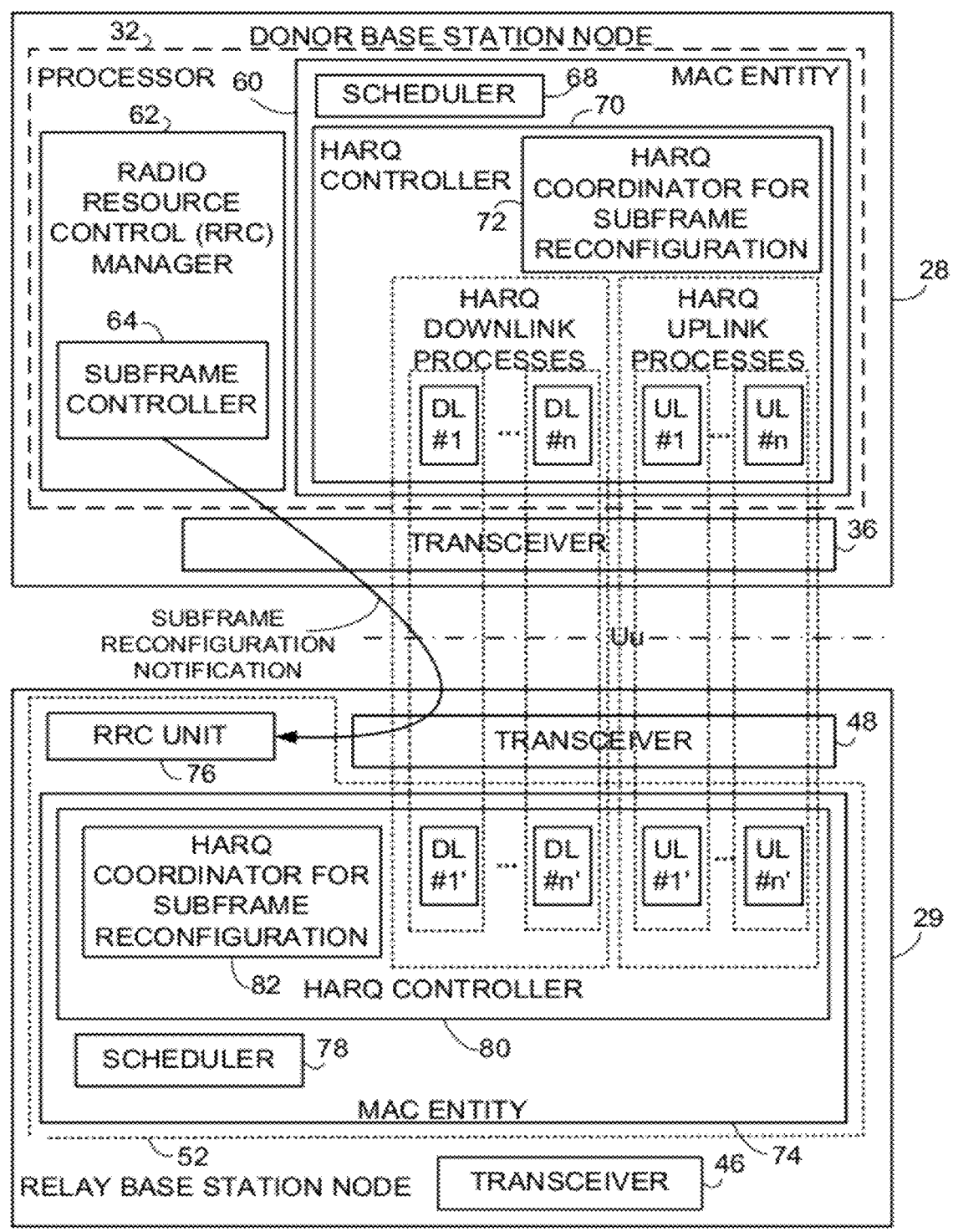
FIG. 6 is a schematic view of certain example structural aspects of a donor base station node and a relay base station node according to an example embodiment.
Figure 7:
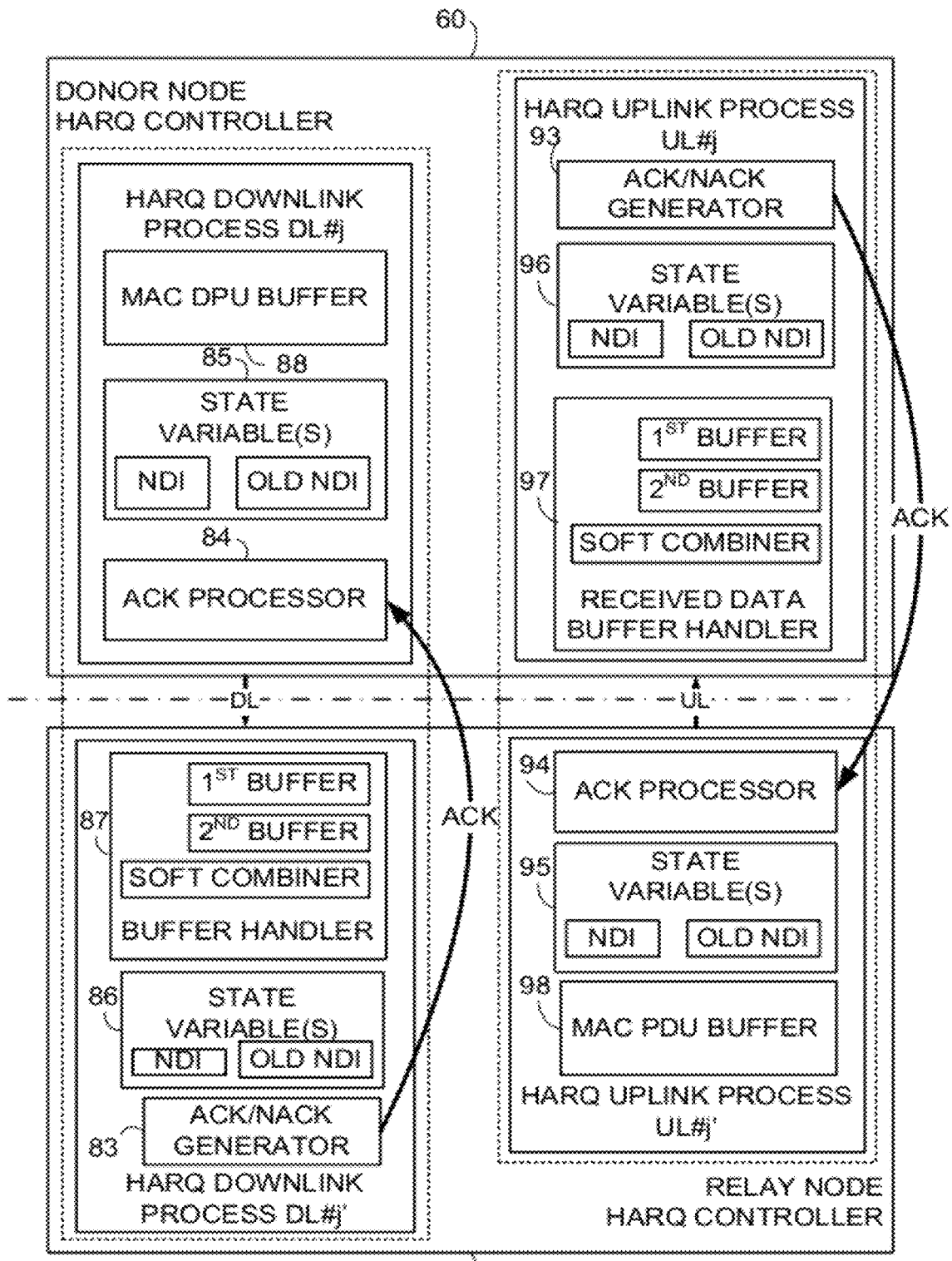
FIG. 7 is a schematic view of selected example details of HARQ processes for both the uplink (UL) and the downlink (DL) for both a donor base station node and relay base station node according to an example embodiment.

FIG. 6 and FIG. 7 illustrate certain example structural aspects of donor base station node 28 and relay base station node 29 in more detail according to an example embodiment. FIG. 6 particularly shows donor base station node 28 as comprising Medium Access Control (MAC) entity 60 and Radio Resource Control (RRC) manager 62. The Radio Resource Control (RRC) manager 62 in turn comprises subframe controller 64. The Medium Access Control (MAC) entity 60 comprises scheduler 68 and HARQ controller 70. The HARQ controller 70 hosts (e.g., performs, executes, or constitutes) plural HARQ downlink (DL) processes, depicted in FIG. 6 as processes DL#1 through DL#n, as well as plural HARQ uplink (UL) processes, depicted as processes UL#1 through UL#n. In addition, HARQ controller 70 comprises HARQ coordinator for subframe configuration 72. It should be appreciated that Medium Access Control (MAC) entity 60 and Radio Resource Control (RRC) manager 62 may comprise or otherwise be realized by, at least in part, processor 32 (see FIG. 5). In at least some example embodiments the HARQ coordinator for subframe configuration 72 may serve as a portion of processor 32 which makes a HARQ process state in a HARQ process at one of the base station nodes known by the other base station node. That is, the subframe configuration 72 may serve as the portion of processor 32 which implements one or more actions to ensure that a HARQ process state in a HARQ process at the relay base station node 29 is known by the donor base station node 28 and/or that a HARQ process state in a HARQ process at the donor base station node is known by the relay base station node, e.g., which makes the HARQ process state in the HARQ process at relay base station node 29 known by donor base station node 28 after the subframe configuration and vise-versa.

In an example embodiment, subframe controller 64 may be the entity which initializes or makes any changes in the subframe configuration pattern, e.g., the entity which implements a subframe reconfiguration. The scheduler 68 is generally the entity which decides which wireless terminal or relay base station node gets a downlink (DL) transmission or gets to transmit on the uplink (UL) on certain resources.

As also shown in FIG. 6, relay base station node 29 comprises Medium Access Control (MAC) entity 74 and Radio Resource Control (RRC) unit 76. The Medium Access Control (MAC) entity 74 comprises scheduler 78 and HARQ controller 80. The HARQ controller 80 hosts (e.g., performs, executes, or constitutes) plural HARQ downlink (DL) processes, depicted in FIG. 6 as processes DL#1' through DL#n', as well as plural HARQ uplink (UL) processes, depicted as processes UL#1' through UL#n'. In addition, HARQ controller 80 comprises HARQ coordinator for subframe configuration 82. It should be appreciated that Medium Access Control (MAC) entity 74 and Radio Resource Control (RRC) unit 76 may comprise or otherwise be realized by, at least in part, the relay processor 42 (see FIG. 5). In at least some example embodiments the HARQ coordinator for subframe configuration 82 may serve as a portion of relay node processor 42 which makes a HARQ process state in a HARQ process at one of the base station nodes known by the other base station node. That is, the subframe configuration 82 may serve as the portion of relay node processor 42 which implements one or more actions to ensure that a HARQ process state in a HARQ process at the relay base station node 29 is known by the donor base station node 28 and/or to ensure that a HARQ process state in a HARQ process at the donor base station node is known by the relay base station node, e.g., which makes the HARQ process state in the HARQ process at relay base station node 29 known by donor base station node 28 after the subframe configuration.

FIG. 6 depicts by broken lines that each of the HARQ processes of donor base station node 28 is preferably paired with a corresponding HARQ process of relay base station node 29. For example, in terms of the downlink (DL) (e.g., transmissions across the Uu interface from donor base station node 28 to relay base station node 29) the HARQ process DL#1 of donor base station node 28 is paired with HARQ process DL#1' of relay base station node 29. Similarly, in terms of the uplink (UL) (e.g., transmissions across the Uu interface from relay base station node 29 to donor base station node 28) the HARQ process UL#1 of donor base station node 28 is paired with HARQ process UL#1' of relay base station node 29.

Thus, in this nomenclature and notation, a HARQ downlink (DL) process is a process which provides an acknowledgement (whether positive or negative) for a transmission on the downlink (DL) from the donor base station node 28 to the relay base station node 29. Both HARQ process DL#1 and HARQ process DL#1' cooperate to provide such an acknowledgement for one such downlink (DL) transmission, with the acknowledgement being sent on the uplink from relay base station node 29 to donor base station node 28. Conversely, a HARQ uplink (UL) process is a process which provides an acknowledgement (whether positive or negative) for a transmission on the downlink (DL) from the donor base station node 28 to the relay base station node 29. Both HARQ process UL#1 and HARQ process UL#1' cooperate to provide such an acknowledgement for one such uplink (UL) transmission, with the acknowledgement being sent on the downlink (DL) from donor base station node 28 to relay base station node 29.

It was stated above that each of the HARQ processes of donor base station node 28 is preferably paired with a corresponding HARQ process of relay base station node 29. While the states of these paired HARQ process should always be in synchronization, there may be error cases where the two states are actually different. But in general there is a tight correlation/interaction between the HARQ process #j in the donor base station node 28 and the HARQ process #j' in the relay base station node 29.

FIG. 7 illustrates selected example details of representative HARQ processes for both the uplink (UL) and the downlink (DL) for both donor base station node 28 and relay base station node 29. FIG. 7 illustrates in particular functional elements of HARQ downlink (DL) process DL#j of donor base station node 28 and its corresponding HARQ downlink (DL) process DL#j' of relay base station node 29, as well as elements of HARQ uplink (UL) process UL#j of donor base station node 28 and its corresponding HARQ uplink (UL) process UL#j' of relay base station node 29.

As understood, e.g., from the foregoing, HARQ process DL#j of donor base station node 28 and HARQ process DL#j' of relay base station node 29 cooperate to provide an acknowledgement for a downlink (DL) transmission, with the acknowledgement being sent on the uplink from relay base station node 29 to donor base station node 28. Thus, for the downlink (DL) the HARQ process DL#j' of relay base station node 29 comprises acknowledgement generator 83 and the HARQ process DL#j of donor base station node 28 comprises acknowledgement receiver/processor 84. Both downlink (DL) HARQ processes DL#j and DL#j' comprise one or more state variables, e.g., a memory for state variables, depicted by state variable(s) 85 in donor base station node 28 and state variable(s) 86 in relay base station node 29. Each of state variable(s) 85 and state variable(s) 86 include the NDI, which can be conceptualized either as a single NDI value or dual storage of an old NDI value and a current NDI value. In addition, the state variable(s) 86 may comprise other state variables such as the number of times a MAC PDU has been transmitted, current redundancy version, and HARQ feedback. Further, each HARQ process comprises a buffer whose contents may also at least partially represent state information, and thus a buffer handler for handing the respective buffer. For example, for the HARQ downlink (DL) process DL#j' the relay base station node 29 comprises buffer handler 87 which operates upon one or more soft buffers and a soft combiner. The for the HARQ downlink (DL) process DL#j the donor base station node 28 comprises MAC PDU buffer 88, for storing a MAC PDU that is to be sent to the relay base station node 29.

Conversely, HARQ process UL#1 of donor base station node 28 and HARQ process UL#1' of relay base station node 29 cooperate to provide an acknowledgement for an uplink (UL) transmission, with the acknowledgement (ACK or NACK, collectively referred to as "ACK") being sent on the downlink (DL) from donor base station node 28 to relay base station node 29. Thus, for the uplink (UL) the HARQ process DL#j of donor base station node 28 comprises acknowledgement generator 93 and the HARQ process DL#j' of relay base station node 29 comprises acknowledgement receiver/processor 94. As understood with respect to the previous discussion of the downlink (DL) HARQ process, uplink (UL) HARQ processes UL#j and UL#j' comprise one or more state variables, e.g., a memory for state variables, depicted by state variable(s) 95 in relay base station node 29 and state variable(s) 96 in donor base station node 28, each of which include the NDI (which again can be conceptualized either as a single NDI value or dual storage of an old NDI value and a current NDI value). In addition, the state variable(s) 96 may comprise other state variables such as the number of times a MAC PDU has been transmitted, current redundancy version, and HARQ feedback. As also understood with respect to the previous discussion of the downlink (DL) HARQ process, for the HARQ uplink (UL) process UL#j' the donor base station node 28 comprises buffer handler 97 (which operates upon one or more soft buffers) and a soft combiner; for the HARQ uplink (UL) process UL#j' the relay base station node 29 comprises MAC PDU buffer 98, for storing a MAC PDU that is to be sent to the donor base station node 28.

In FIG. 7 both buffer handler 87 and buffer handler 97 are illustrated as comprising plural buffers, e.g., a first buffer and a second buffer, as well as a soft combiner for soft combining the contents of the first buffer and the second buffer. It should be appreciated, however, that in some example embodiments there may be just one "soft" buffer per HARQ process, as explained, for example, in Dahlman, Erik; Parkvall, Stefan; and Skoeld, Johan, in 4G *LTE-Advanced for Mobile Broadband*, section 12.1, page 249. In this regard, multiple "soft-bits" may represent one bit of "hard" information.

Moreover, it should be noted that while the buffers managed by buffer handler 87 and buffer handler 97 logically comprise the respective HARQ processes, there is not always a physical memory location constantly allocated to a certain HARQ process, since buffer memory may be shared dynamically between HARQ processes. Accordingly, the FIG. 7 representation should be understood as being a functional view and further that other implementations may arrange or structure functionality in different ways or have different physical incarnations of the functionalities.

Similarly, the state variable(s) 86 of relay base station node 29 and the state variable(s) 96 of donor base station node 28 are illustrated as including both an old NDI value register and a (current) NDI value register. In some example embodiments only one instance of NDI need be stored, e.g., the old NDI. The new NDI is compared to the old NDI once, and after that the old NDI is no longer relevant and can be replaced by the "new" NDI.

Modes of Operation

Overview

Having described example structure of a generic donor base station node 28 and relay base station node 29, discussion now turns to a generic method of operation of radio access network 20 such as that of FIG. 5. As understood from the previous discussions, radio access network 20 comprises a donor base station node such as donor base station node 28 and a relay base station node such as relay base station node 29, with relay base station node 29 participating in communications across a first radio interface (e.g., the Uu interface) with a wireless terminal and also participating in communications over a backhaul link across a second radio interface (e.g., the Un interface). The second radio interface (e.g., the Un interface) reuses at least some functionality of the first radio interface (e.g., the Uu interface), such reused functionality including in some (but not necessarily all) cases at least some of the frequencies within the system bandwidth of the Uu interface.

Figure 8:
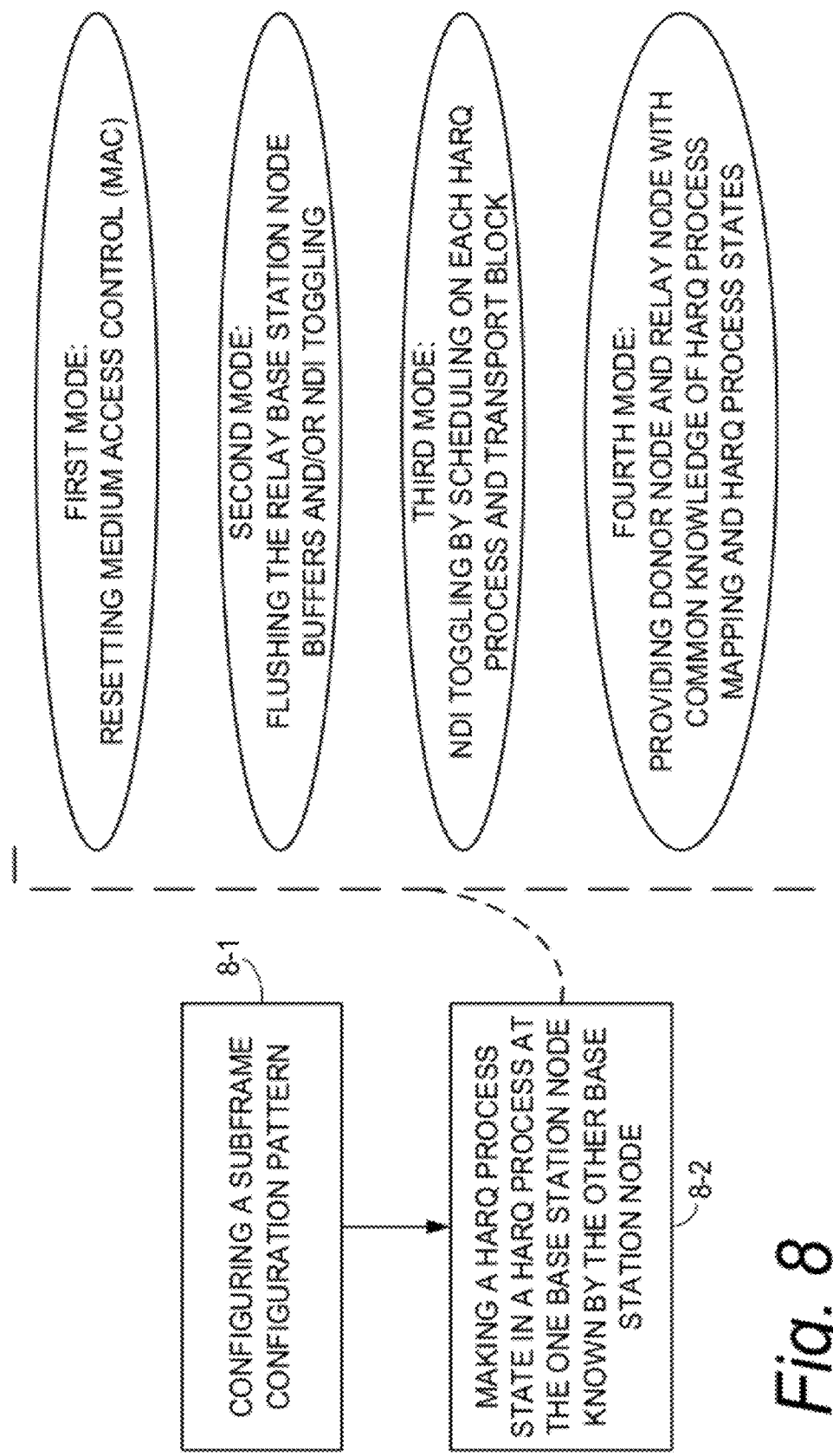
FIG. 8 is a flowchart showing example acts or steps involved in a generic method of operating a communications system in a manner to make a HARQ process state in a HARQ process at one of the base station nodes known by the other base station node.

Basic example, representative acts or steps of the generic method are depicted in FIG. 8. Act 8-1 comprises configuring a subframe configuration pattern. The subframe configuration pattern is arranged to specify which subframe(s) of a frame structure may be utilized for the backhaul link. In an example embodiment and mode the re-configuring comprises changing, for example, a number of HARQ processes in the donor base station node and the relay station node and/or changing a mapping of HARQ processes to subframes of the frame structure. Act 8-1 may be performed by a processor such as processor 32 of donor base station node 28, and in an example embodiment by subframe controller 64.

Act 8-2 follows as a result of the configuring of act 8-1, and in various modes may be triggered by generating and/or transmission of the indication of the subframe reconfiguration (e.g., the subframe reconfiguration notification of FIG. 6). As used herein "as a result" encompasses, e.g., address or countering the consequences of the configuration of the subframe configuration pattern. Act 8-2 comprises making a HARQ process state in a HARQ process at one of the base station nodes (either donor base station node 28 or relay base station node 29) known by the other base station node (e.g., relay base station node 29 or donor base station node 28).

Act 8-2 may involve implementing one or more actions to ensure that post-configuration operation of the HARQ process(es) at one of the base station nodes including the HARQ process state(s) is/are coordinated and compatible with post-configuration operation of the other base station node, e.g., of the HARQ process in the other base station node. For example, act 8-2 may comprise rendering the HARQ process state of the HARQ process at one of the base station nodes operationally compatible after the configuration by adjusting or setting contents of state buffers of the HARQ process and values of the HARQ process state variables (e.g., NDI) of HARQ processes in either of the base station nodes so that such that such contents and values will be known or assumed known by the other node and thus enable the two nodes to continue to operate in coordination and with proper decoding after the subframe configuration. As explained herein, in different implementations either one or both of the processor 32 of donor base station node 28 and the relay node processor 42 of relay base station node 29 may be involved in performing act 8-2.

Thus, the technology disclosed herein makes a HARQ process state in a HARQ process at one of the base station nodes known by the other base station node, e.g., by a HARQ process of the other base station node. For example, in one example implementation a HARQ process state in a HARQ process at the relay base station node 29 is made known to a HARQ process in the donor base station node 28. In a second example implementation a HARQ process state in a HARQ process at the donor base station node 28 is made known to a HARQ process in the relay base station node 29. In a third example implementation, the HARQ process states of the HARQ processes of donor base station node 28 and relay base station node 29 are mutually made known to each other.

Performance of act 8-2, e.g., making the HARQ process state in the HARQ process at one of the base station nodes known by the other base station node, may be realized in various embodiments and modes. Four different embodiments and modes are discussed in more detail below, and some comprise various options and optional implementations. Before discussing each embodiment and mode separately, a brief overview of the four embodiments and modes is provided below:

1. First Mode: the relay base station node resetting Medium Access Control (MAC).

2. Second Mode: ensuring new transmissions by flushing the relay base station node buffers and/or NDI toggling.

3. Third Mode: the donor base station node ensuring NDI toggling by scheduling on each HARQ process and transport block to ensure that the NDI is considered toggled when the next transmission is due.

4. Fourth Mode: the relay base station node and the donor base station node applying a predetermined, known mapping rule between HARQ processes in use before the subframe configuration pattern change, and HARQ processes in use after the subframe configuration pattern change.

Modes of Operation

First Mode

In a first example mode, act 8-2 (making the HARQ process state in the HARQ process at one of the base station nodes known by the other base station node) comprises performing a medium access control (MAC) reset procedure at the donor base station node and at the relay base station node.

As all HARQ status is maintained in the MAC layer, a MAC reset will ensure that all status is cleared and give all HARQ processes a fresh start. The MAC reset procedure is described in 3GPP TS specification 3GPP TS 36.321, "Evolved Universal Terrestrial Radio Access (E-UTRA); Medium Access Control (MAC) protocol specification," v10.0.0 (the "36.321 Specification"), which is incorporated herein by reference in its entirety. In general, a MAC reset (described in 3GPP TS 36.321, paragraph 5.9) serves to reset, e.g., a number of MAC-related timers, buckets for prioritization between logical channels, and also certain procedures (if ongoing) are stopped. A MAC reset typically occurs in the prior art at handover, at handover failure, when the wireless terminal or relay base station node leaves RRC Connected, at reception of a RRCConnectionReestablishment message, at reception of a RRCConnectionReject message, when an RRCConnectionRequest times out or the wireless terminal performs cell reselection before the RRCConnectionRequest has been answered.

According to this first mode, the MAC reset procedure involves both Medium Access Control (MAC) entity 60 in donor base station node 28 and Medium Access Control (MAC) entity 74 in relay base station node 29. In prior art, the wireless terminal performs a MAC reset at defined instances (standardized), meaning that the donor base station node knows when the wireless terminal performs a MAC reset. But in this first mode of the technology disclosed herein, the indication of the subframe reconfiguration (e.g., the subframe reconfiguration notification of FIG. 6) as sent from donor base station node 28 to relay base station node 29 serves as a signal to relay base station node 29 to perform the MAC reset procedure.

The following excerpts from the aforementioned 3GPP TS 36.321 are particularly of interest, keeping in mind however that actions in the 3GPP TS 36.321 described as "UE actions" for the purpose of the technology disclosed herein concern instead actions of the relay base station node 29:

---
\*\* excerpt from the 36.321 Specification \*\*\*\*\*\*\*\*\*\*\*\*
If a reset of the MAC entity is requested by upper layers, the UE shall:
[...]
    consider timeAlignmentTimer as expired and perform the corresponding actions in subclause 5.2;
    set the NDIs for all uplink HARQ processes to the value 0;
[...]
    flush the soft buffers for all DL HARQ processes;
    for each DL HARQ process, consider the next received transmission for a TB as the very first transmission;
\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

---

The actions on timeAlignmentTimer expiry further involve the flushing of all HARQ buffers, ensuring that there are no leftover MAC PDUs in UL buffers, which in its turn ensures that the next transmission on that HARQ process will be a new transmission.

As used herein "flushing" of a buffer means that the contents of the buffer are unavailable or irretrievable. In some implementations such flushing may involve a disposal or removal of the contents of a buffer, e.g., the contents of a HARQ process buffer. In other example implementations the flushing may be handled by removing a pointer to the flushed contents of the buffer, or setting a flag to indicate that the buffer has no data, even though the physical data may still be present. In any implementation, a flushed buffer is one whose contents immediately after the flushing is not meant to be retrieved.

---
\*\* excerpt from the 36.321 Specification \*\*\*\*\*\*\*\*\*\*
    if the uplink grant was received on PDCCH for the C-RNTI and the HARQ buffer of the identified process is empty; or
[...]
    instruct the identified HARQ process to trigger a new transmission.
\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

---

Figure 9:
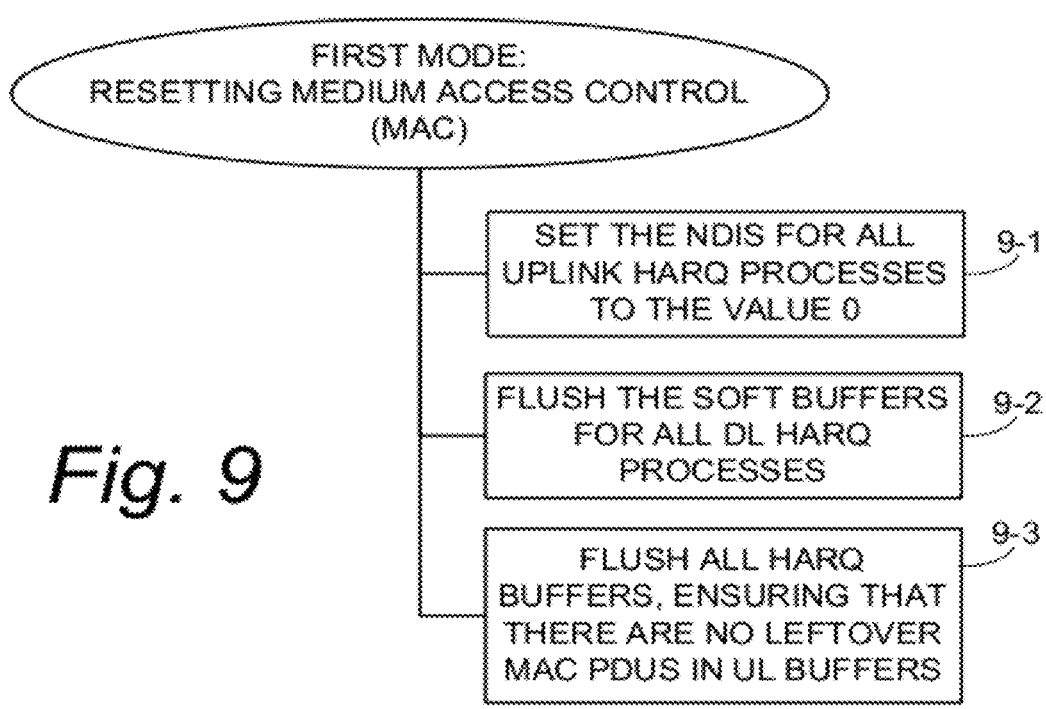
FIG. 9 is a diagrammatic view depicting example acts or steps comprising a first mode of implementation an act of the generic method of FIG. 8.

Thus, as understood from the foregoing and illustrated by the basic acts of FIG. 9, the first mode comprises, e.g., setting the NDIs for all uplink HARQ processes to the value 0 (act 9-1); flushing the soft buffers for all DL HARQ processes (act 9-2); and flushing all HARQ buffers, thereby ensuring that there are no leftover MAC PDUs in UL buffers (act 9-3).

The MAC reset procedure resets the entire MAC layer, which of course implies more than just the reset of HARQ buffers. Among other things, the MAC reset procedure makes the time alignment expire, which causes the wireless terminal 30/relay base station node 29 to perform a random access procedure to get back its timing alignment. For the purpose of achieving a known HARQ process state, a random access procedure is not needed. Furthermore, the contents (if any) of the HARQ buffers that are flushed is lost making soft combining for that data impossible. To recover the data, retransmissions on higher layers, e.g., RLC, may be implemented, which will take time. In case the RLC Unacknowledge D mode (UM) is used, it may even lead to data loss. In the RLC UM mode the RLC does not provide acknowledgement of data, and hence does not provide retransmissinons. In the RLC UM mode an RLC PDU, once sent, is not resent even if not acknowledged.

The donor base station node need not perform a MAC reset. The donor base station nodes needs to know that/when the relay base station node performs its MAC reset, but there is no standardized "MAC reset procedure" for the donor base station node (or for the eNodeB in the case of eNB-wireless terminal communication). Instead, the donor base station nodes actions are left to implementation. The donor base station node should empty its uplink (UL) receive buffers to avoid soft combining with new data (or that the donor base station node will empty its uplink (UL) receive buffers when new data is received) and it is useful (not necessary) that the donor base station node puts new data into its DL transmit buffers.

The MAC reset procedure is an already specified procedure already in use for other purposes, which is now recognized for achieving the purpose of a known HARQ process state after a change in the subframe configuration pattern.

Modes of Operation

Second Mode

In a second example mode, act 8-2 (making the HARQ process state in the HARQ process at one of the base station nodes known by the other base station node) essentially comprises performing an abbreviated or modified (e.g., a lightweight) version of the first mode, e.g., performing only a subset of the MAC reset procedure that is required to achieve a known HARQ process state.

Figure 10:
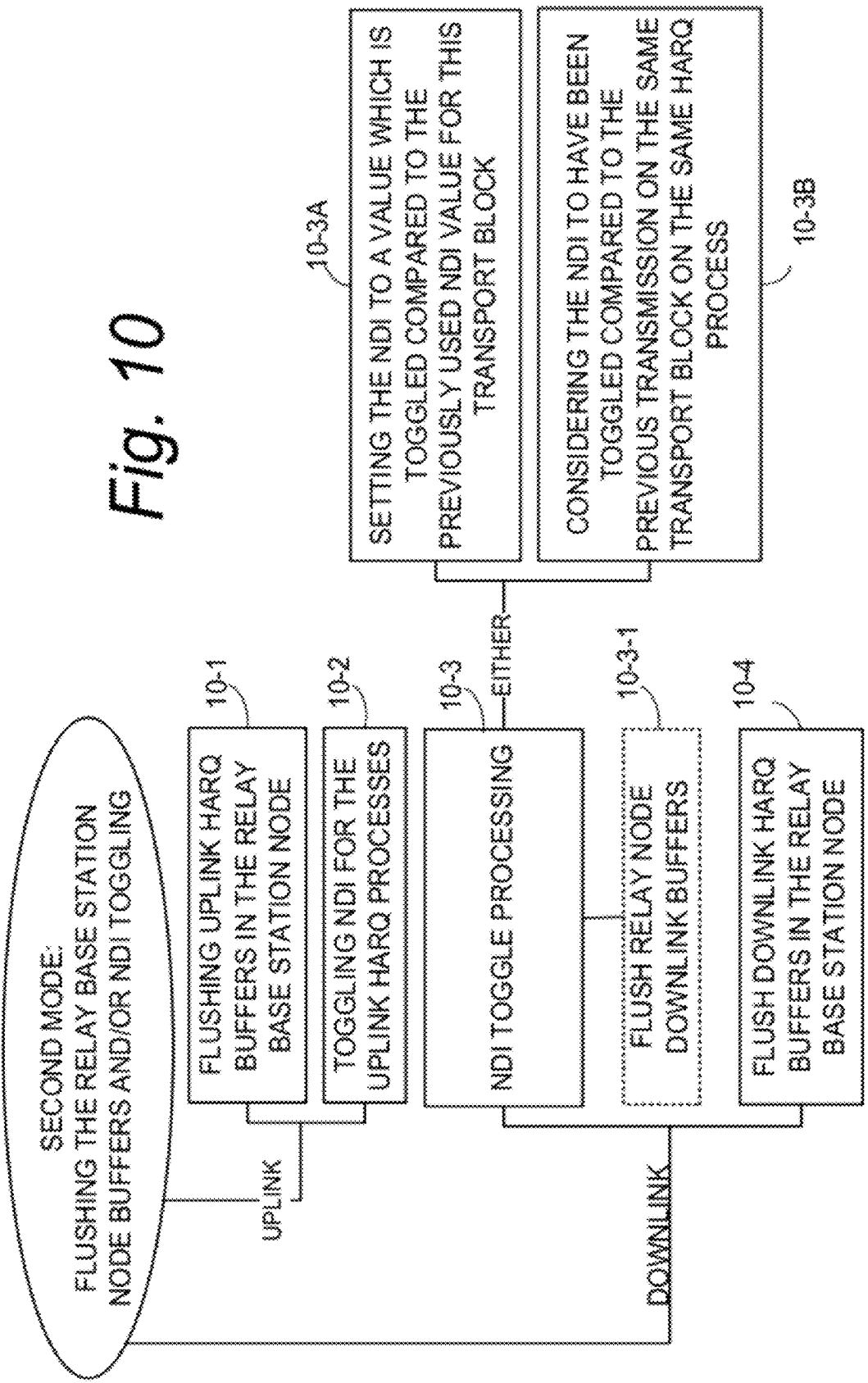
FIG. 10 is a diagrammatic view depicting example acts or steps comprising a second mode of implementation an act of the generic method of FIG. 8.

The subset of operations involved in this second mode for the uplink (UL) is depicted by either by act 10-1 or act 10-2 of FIG. 10. Acts 10-1 and 10-2 are thus two alternative acts, either of which may be implemented as an option.

Act 10-1 comprises flushing the UL HARQ buffers in relay base station node 29. This flushing ensures that the next transmission on each HARQ process will be a new transmission and that the donor base station node 28 should not attempt to soft combine a new transmission with any previously stored decoding result of any HARQ buffer. In other words, the flushing of act 10-1 ensures that the relay base station node 29 always sends new data, irrespective of NDI as it has no old data in its HARQ process buffers to send. However, this does not ensure that the donor base station node 28 does not try to combine the new data with previously stored data (it may be left up to the donor base station node 28 to keep track of subframe reconfiguration and determine for itself that it should not soft combine.

Act 10-2 comprises toggle processing of the NDI. A toggled NDI on the uplink (UL) guarantees that the relay base station node 29 sends a new transmission rather than a retransmission.

The subset of operations involved in this second mode for the downlink (DL) is depicted by either by act 10-3 or act 10-4 of FIG. 10. Acts 10-3 and 10-4 are thus two alternative acts, either of which may be implemented as an option.

Act 10-3 comprises considering a next received transmission of a transport block as a new transmission. Act 10-3 in turn may be performed in either of two alternative ways, as depicted by acts 10-3A and 10-3B in FIG. 10.

Act 10-3A comprises explicitly making the next received transmission a new transmission by setting the NDI to a value which is toggled compared to the previously used NDI value for this transport block on this HARQ process.

The alternative act 10-3B comprises (artificially, by specification) considering the NDI to have been toggled compared to the previous transmission on the same transport block on the same HARQ process, if a change in the subframe configuration pattern has occurred since the previous transmission. In act 10-3B, the donor base station node 28 considers the NDI signaled by the donor base station to be toggled for the uplink (UL) HARQ process with which the NDI is associated.

Further explaining act 10-3A and act 10-3B, the NDI is a value, 0 or 1, signaled by the DeNB. The relay base station node 29 keeps an NDI value per HARQ process. When a new NDI is received, say 0, for example, the relay base station node 29 compares the 0 with the previously stored NDI value and concludes "toggled" or "not toggled". In that conclusion, the relay base station node 29 has a choice. Assume that signaled value is 0. The stored NDI value is also 0 so the NDI is not toggled, but as act 10-3B the relay base station node 29 "may consider the NDI toggled". In particular, the relay base station node 29 would consider the NDI signaled as being toggled compared to the previous NDI value for the same HARQ process, irrespective of the NDI value signaled. This is what is meant herein by "artificially". "By specification" means that the relay base station node 29 is instructed, e.g., by code, to consider the NDI toggled, and that the donor base station node 28 knows that the relay base station node 29 will consider the NDI toggled. The RN does not physically toggle the NDI as the NDI, but instead, per definition, the NDI signaled by the donor base station node 28.

In conjunction with act 10-3, as depicted by act 10-3-1 the relay base station node 29 may optionally flush its downlink (DL) buffers. However, the NDI toggling involved in act 10-3 is sufficient to ensure that the next downlink (DL) transmission is considered a new transmission.

Act 10-4, which may be performed for the downlink (DL) as an alternative to act 10-3, comprises flushing the downlink (DL) HARQ buffers of relay base station node 29. The next transmission for a specific HARQ process will then be considered either a new transmission or a retransmission, depending on the NDI state. If it is considered a new transmission, the problem is solved. If it is considered a retransmission, the newly transmitted data will be combined with the data in the HARQ buffer, but since there is no data in the HARQ buffer, the net effect is that the new data is stored in the HARQ buffer as if it had been a new transmission. See the 3GPP TS 36.321 Specification including the excerpt below, where since there is no data in the HARQ buffer, the condition that the data has not yet been successfully decoded will always be true.

********** excerpt from the 36.321 Specification **********
else if this is a retransmission:
    if the data has not yet been successfully decoded:
    combine the received data with the data currently
    in the soft buffer for this TB.
***************************************************

Modes of Operation

Third Mode

In a third example mode, act 8-2 (making the HARQ process state in the HARQ process at one of the base station nodes known by the other base station node) essentially comprises the donor base station node 28 scheduling the relay base station node 29 with a certain or specified value of the NDI on each HARQ process to be used after the subframe configuration pattern change. The scheduling of the certain value of the NDI may occur before or after changing the subframe configuration pattern, and advantageously does not require any change of specification of MAC handling at subframe configuration pattern change.

As shown by FIG. 11, in conjunction with the third example mode for the downlink (DL) the donor base station node 28 may first performed either act 11-1A or act 11-1B. Act 11-1A comprises the donor base station node 28, e.g., Medium Access Control (MAC) entity 60, keeping a record of the previous state of each HARQ process and hence ensure a toggled NDI in the next downlink (DL) assignment. In keeping a record of the previous state of each HARQ process the donor base station node 28 will know the NDI associated with that previous state when a subframe reconfiguration occurs, and thus will easily be able then to generate a record or table showing what value the NDI will have for each HARQ process when toggled after the subframe reconfiguration.

Alternatively, rather than keep track of the NDI states, as a simplification represented by act 11-1B the donor base station node 28 may schedule a transmission with an arbitrary NDI value. This scheduling would be done not primarily for the purpose of data transmission, but to achieve a known NDI state on each HARQ process. After such scheduling, the NDI value of the previous transmission will be known again in both the relay base station node 29 and the donor base station node 28 and any subsequent downlink (DL) assignment can indicate an NDI which will be considered toggled from the previous, hence indicating a new downlink (DL) transmission.

As shown by optional act 11-2 for the downlink (DL), the data transmission may consist of dummy data, inserted only for the purpose of this special transmission, to ensure that no data is lost.

For the third example mode for the downlink (DL) a similar method can be used. On the uplink (UL) the donor base station node 28 cannot know the NDI state of a HARQ process, as it does not know which HARQ process is in use. But in accordance with this third mode, as act 11-3 the donor base station node 28 give the relay base station node 29 an uplink (UL) grant with a fixed NDI value per HARQ process and transport block. The donor base station node 28 will not know whether the transmission corresponding to this grant will be a transmission or a retransmission, but for any the subsequent grants, the NDI state of the HARQ processes will again known to the donor base station node 28.

For the uplink (UL), the donor base station node 28 cannot control what data is sent on the UL grant. But to ensure that there is no data loss, the donor base station node 28 may give a very small grant, e.g., a grant not large enough for any payload data (only large enough to hold headers and padding).

If indeed real payload data is scheduled, in DL and/or UL, and such data is successfully decoded on the MAC layer, higher layers may ensure removal of duplicates in case a retransmission occurred when giving the NDI a known state.

This kind of scheduling solution naturally uses air interface resources which could otherwise have been used for real data, and causes delay, but avoids specification impact, e.g., change of standardization specifications.

Modes of Operation

Fourth Mode

In a fourth example mode, act 8-2 (making the HARQ process state in the HARQ process at one of the base station nodes known by the other base station node) essentially comprises providing the donor base station node 28 and the relay base station node 29 with common knowledge of the HARQ process mapping and HARQ process states. This may be done by applying a predetermined, known mapping rule between the HARQ processes in use before and after the subframe configuration pattern change.

The HARQ processes mapping, e.g., the HARQ processes mapping rule, may take various forms. In a first form, represented by mapping rule 12-1, the mapping rule may be a mapping of old HARQ process number to new HARQ process number. In a second form, represented by mapping rule 12-2, the mapping rule may be a mapping of HARQ process number to subframe number. The mapping rules may take the form of a table such as shown in FIG. 12A and FIG. 12B, or any other appropriate association.

Figure 12A:
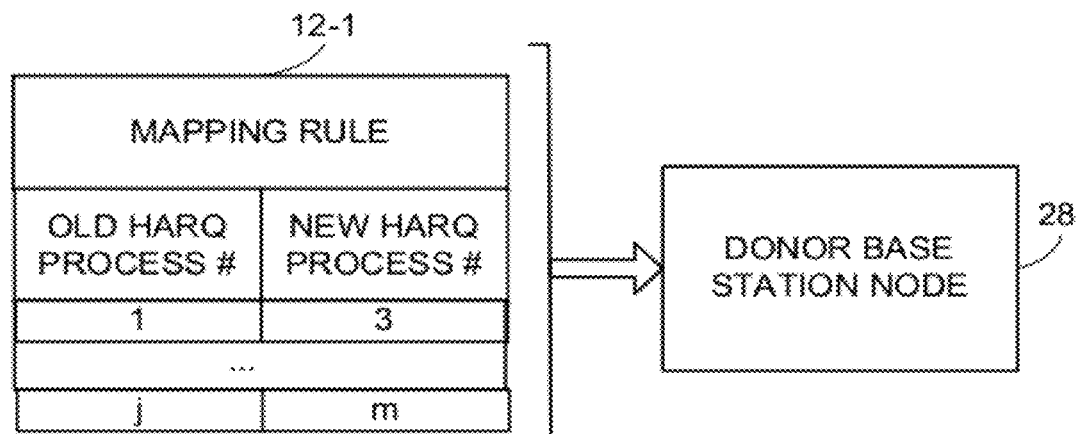
FIG. 12A is a diagrammatic view depicting a first example implementation of transmission of a mapping rule in accordance with a fourth mode of implementation an act of the generic method of FIG. 8.
Figure 12B:
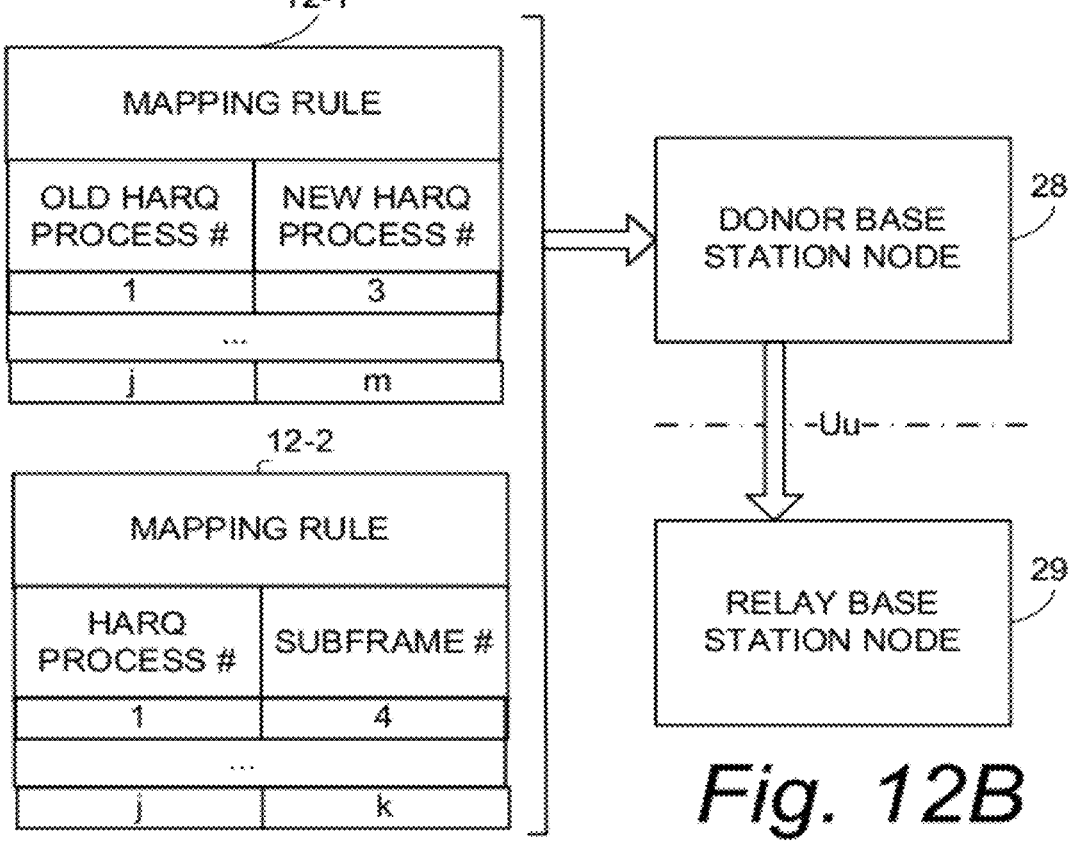
FIG. 12B is a diagrammatic view depicting a second example implementation of transmission of a mapping rule in accordance with a fourth mode of implementation an act of the generic method of FIG. 8.

As shown in FIG. 12A, the mapping rule (either mapping rule 12-1 or mapping rule 12-2) may be predetermined or specified, e.g., pre-stored (e.g., stored at least before the subframe configuration pattern change) in both donor base station node 28 and relay base station node 29. By "predetermined" or "specified" may mean that the information is common information that is mutually agreed by the donor base station node 28 and relay base station node 29. The mapping rule may be stored in or maintained by the HARQ controller 70 of the donor base station node 28 and the HARQ controller 80 of relay base station node 29, for example.

Alternatively, the mapping rule (either mapping rule 12-1 or mapping rule 12-2) may be stored in one of the nodes and then signaled to the other node. For example, as shown in FIG. 12B, the mapping rule may be stored in donor base station node 28 (e.g., at the HARQ controller 70) and then signaled, e.g., before or after the subframe configuration pattern change, to relay base station node 29 (e.g., to HARQ controller 80 of relay base station node 29).

Once the relay base station node 29 and the donor base station node 28 have a common understanding of which "old" HARQ process each "new" HARQ process corresponds to, the HARQ process state is also known in both nodes, and thus act 8-2 is fulfilled.

Known mapping (e.g., use of a mapping rule) means that stored soft information in HARQ buffers may be reused and the full advantage of HARQ may be utilized. Mapping also ensures that there is not any data loss at HARQ level, as would be caused when HARQ buffers are flushed.

As the mapping is known, and the state of the HARQ processes before the subframe configuration pattern change was known, the state of the HARQ processes after the change will be known. This is true in all cases, except for HARQ processes that were not in use before the change. As there are never more HARQ processes in use for an relay base station node with an RN subframe configuration than for that same relay node before it had its RN subframe configuration, all HARQ processes have at some point in time been used, but the assumption so far has been that only the history of the HARQ processes before the latest change was taken into account. This issue can be solved by either (1) looking back in time until the last time each HARQ process was used, in which case each HARQ process will have a known state, or (2) specifying a known HARQ process state for HARQ processes not in use before the change in subframe configuration pattern, including setting NDI to a fixed value (e.g., NDI=0) and ensuring empty buffers.

Conversely, when the number of HARQ processes decreases after a subframe configuration pattern change, some HARQ processes will not be used after the change and thus are superfluous HARQ processes. The mapping rule can in this case be (without precluding other mapping rules): (1) in the downlink (DL), remove the superfluous HARQ processes with the highest or lowest number (HARQ process ID), or (2) for both uplink (UL) and downlink (DL), prioritize for removal those HARQ processes that have no pending retransmissions (e.g., the superfluous HARQ processes).

The HARQ process ID is signaled for the downlink (DL). This means that for the downlink (DL), and the downlink (DL) only, the donor base station node 28 and relay base station node 29 have a common understanding of which HARQ process is HARQ process #1, HARQ process #2, etc. But for the uplink (UL), a HARQ process just has a peer in the other node, without there necessarily being a number, or the number being the same in the donor base station node 28 and the relay base station node 29.

An advantage of this mapping solution allows transmission to continue smoothly despite the occurrence of a subframe configuration pattern change (i.e., initial transmission before and retransmission after the change).

Operation

Data Loss

In all embodiments where the contents of a buffer is flushed or the NDI is explicitly or artificially toggled, data can be lost. "Data loss" means that a MAC PDU is not properly decoded, and thus "lost", e.g., that the content of the PDU (payload data and possibly the MAC control information) is not delivered to or usable by the respective receivers, whether in the donor base station node 28 or in the relay base station node 29. If an upper layer Radio Link Control (RLC) procedure is run in acknowledged mode, the RLC may provide retransmissions of the RLC PDU, which contains the MAC PDU. Thus, the "data loss" may be captured on higher layers (e.g., the RLC) by retransmissions. These retransmissions may cause some transmission delay, or in some cases, depending on the configuration of higher layers, will lead to permanent data loss. This has to be taken into account before the change of the subframe configuration pattern.

In particular embodiments, various example embodiments described herein ensure that the state of HARQ processes is known after an RN reconfiguration including the subframe configuration pattern. This removes ambiguity at the donor node side upon receiving an uplink (UL) transmission from the relay base station node 29 after a subframe configuration pattern, and ensures that the donor base station node 28 can schedule downlink (DL) transmissions (with associated HARQ process numbers and redundancy version) in an optimized way.

The acts which have above been described as being implemented or executed by a processor may be performed by any suitable machine. The machine may take the form of electronic circuitry in the form of a computer implementation platform or a hardware circuit platform. A computer implementation of the machine platform may be realized by or implemented as one or more computer processors or controllers as those terms are herein expansively defined, and which may execute instructions stored on non-transient computer-readable storage media. In such a computer implementation the machine platform may comprise, in addition to a processor(s), a memory section (which in turn can comprise random access memory; read only memory; an application memory (a non-transitory computer readable medium which stores, e.g., coded non instructions which can be executed by the processor to perform acts described herein); and any other memory such as cache memory, for example). Another example platform suitable is that of a hardware circuit, e.g., an application specific integrated circuit (ASIC) wherein circuit elements are structured and operated to perform the various acts described herein.

Although the description above contains many specificities, these should not be construed as limiting the scope of the technology disclosed herein but as merely providing illustrations of some of the presently preferred embodiments of the disclosed technology. Thus the scope of this technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of operating a radio access network comprising a donor base station node and a relay base station node, the relay base station node participating in communications across a first radio interface with a wireless terminal and also participating in communications over a backhaul link across a second radio interface, the second radio interface reusing at least some functionality, the method comprising:
   configuring a subframe configuration pattern, the subframe configuration pattern being arranged to specify which subframe(s) of a frame structure may be utilized for the backhaul link; and as a result thereof,
   making a HARQ process state in a HARQ process at one of the base station nodes known by the other base station node
   wherein the act of configuring the subframe configuration pattern comprises re-configuring the subframe configuration pattern after a previous configuration of the subframe pattern, the re-configuring comprising changing a number of HARQ processes in at least one of the donor base station node or the relay station node and/or changing a mapping of HARQ processes to subframes of the frame structure; and
   wherein making the HARQ process state in the HARQ process at one of the base station nodes known by the other base station node is performed in response to the re-configuring.

2. The method of claim 1, further comprising using a processor to make the HARQ process state in the HARQ process at one of the base station nodes known by the other base station node.

3. The method of claim 1, further comprising making a HARQ process state in a HARQ process at the relay base station node known by the donor base station node and/or making a HARQ process state a the HARQ process at the donor base station node known by the relay base station node.

4. The method of claim 1, wherein making the HARQ process state in the HARQ process at one of the base station nodes known by the other base station node comprises:
   mapping a HARQ process executed at the donor base station node and a corresponding HARQ process executed at the relay base station node to one or more subframes; and
   providing a value for a HARQ process state variable to the HARQ process executed at the donor base station node and to the corresponding HARQ process executed at the relay base station node.

5. The method of claim 4, wherein the HARQ process state variable comprises a new data indicator (NDI).

6. The method of claim 1, wherein making the HARQ process state in the HARQ process at one of the base station nodes known by the other base station node comprises performing a medium access control (MAC) reset procedure at least at the relay base station node.

7. The method of claim 1, wherein making the HARQ process state in the HARQ process at one of the base station nodes known by the other base station node comprises:
   flushing uplink HARQ buffers in the relay base station node; and
   either:
      considering a next received transmission of a transport block in the relay base station node as a new transmission; or
      flushing downlink HARQ buffers in the relay base station node.

8. The method of claim 7, wherein considering the next received transmission of the transport block as the new transmission comprises either:

setting a new data indicator (NDI) to a value which is toggled compared to a previously used NDI value for the transport block for the HARQ process; or considering the NDI to have been toggled compared to a previous transmission on the same transport block on the same HARQ process if a change in the subframe configuration pattern has occurred since the previous transmission.

9. The method of claim 1, wherein making the HARQ process state in the HARQ process at one of the base station nodes known by the other base station node comprises:

for a downlink HARQ process, after the subframe configuration scheduling the relay base station node with a specified value of a new data indicator (NDI) on each downlink HARQ process corresponding to a toggling of the NDI from a last transmission on each HARQ process by first scheduling a first transmission with an NDI, and then scheduling a second transmission with an NDI which is toggled compared to the first transmission;

for a uplink HARQ process, providing the wireless terminal with a first uplink grant and associating with the first uplink grant a new data indicator (NDI) value for the HARQ process and transport block and subsequently providing the wireless terminal with a second uplink grant associated with a new NDI value which is toggled compared to the first uplink (UL) grant NDI.

10. The method of claim 9, wherein the method further comprises using dummy data in the first transmission.

11. The method of claim 9, wherein for the downlink HARQ process scheduling the relay base station node with the specified value of the new data indicator (NDI) on each HARQ process comprises keeping a record of a previous state of each HARQ process and toggling the new data indicator (NDI) in a next downlink assignment.

12. The method of claim 1, wherein making the HARQ process state in the HARQ process at one of the base station nodes known by the other base station node comprises providing the HARQ process executed at the donor base station node and the corresponding HARQ process executed at the relay base station node with common knowledge of HARQ process mapping and HARQ process states.

13. The method of claim 12, wherein providing the HARQ process executed at the donor base station node and the corresponding HARQ process executed at the relay base station node with common information of HARQ process mapping comprises providing common information regarding at least one of:

mapping of HARQ process number to subframe(s); and
pre-configuration HARQ process number to post-configuration HARQ process number.

14. The method of claim 12, wherein providing common information of HARQ process mapping and HARQ process states comprises the providing common information as pre-determined information or as information signaled between the donor base station node and the relay base station node.

15. The method of claim 12, further comprising reusing pre-configuration soft information stored in HARQ buffers of the HARQ processes after the configuration.

16. The method of claim 12, wherein if a number of HARQ processes in use after the configuration is less than a number of HARQ processes in use before the configuration whereby after the configuration at least one HARQ process is a superfluous HARQ process, the method further comprises:

removing any superfluous downlink HARQ processes in a predetermined pattern; or for both uplink HARQ processes and downlink HARQ processes, prioritizing removal of HARQ processes that have no pending transmission.

17. A donor base station node of a radio access network which participates in communications over a backhaul link across a radio interface with a relay base station, the node comprising a processor arranged:

to configure a subframe configuration pattern, the subframe configuration pattern being arranged to specify which subframe(s) of a frame structure may be utilized for the backhaul link and which subframes(s) of the frame structure may be utilized for communications between the relay base station and a wireless terminal;

in response to configuration of the subframe configuration pattern, to make a HARQ process state in a HARQ process at one of the base station nodes known by the other base station node, wherein the processor is arranged to configure the subframe configuration pattern as a re-configuration of the subframe configuration pattern after a previous configuration of the subframe pattern, the re-configuration comprising changing a number of HARQ processes in at least one of the donor base station node or the relay station node and/or changing a mapping of HARQ processes to subframes of the frame structure, and wherein the processor is configured to make the HARQ process state in the HARQ process at one of the base station nodes known by the other base station node in response to the re-configuration.

18. The donor base station node of claim 17, wherein the processor is configured to make a HARQ process state in a HARQ process at the relay base station node known by the donor base station node and/or make a HARQ process state a HARQ process at the donor base station node known by the relay base station node.

19. The donor base station node of claim 17, wherein the processor is configured to make the HARQ process state in the HARQ process at one of the base station nodes known by the other base station node by:

mapping the HARQ process executed at the donor base station node and the corresponding HARQ process executed at the relay base station node to one or more subframes;

providing a HARQ process state variable to the HARQ process executed at the donor base station node and the corresponding HARQ process executed at the relay base station node.

20. The donor base station node of claim 19, wherein the HARQ process state variable comprises a new data indicator (NDI).

21. The donor base station node of claim 17, wherein the processor is configured to make the HARQ process state in the HARQ process at one of the base station nodes known by the other base station node by performing a medium access control (MAC) reset procedure.

22. The donor base station node of claim 17, wherein the processor is configured make the HARQ process state in the HARQ process at one of the base station nodes known by the other base station node by:

for a downlink HARQ process, after the subframe configuration scheduling the relay base station node with a specified value of a new data indicator (NDI) on each downlink HARQ process corresponding to a toggling of the NDI from a last transmission on each HARQ process by first scheduling a first transmission with an NDI, and then scheduling a second transmission with an NDI which is toggled compared to the first transmission;

for a uplink HARQ process, providing the wireless terminal with a first uplink grant and associating with the first uplink grant a new data indicator (NDI) value for the HARQ process and transport block and subsequently providing the wireless terminal with a second uplink grant associated with a new NDI value which is toggled compared to the first uplink (UL) grant NDI.

23. The donor base station node of claim 22, wherein the processor is configured to use dummy data in the first transmission.

24. The donor base station node of claim 22, wherein the processor is configured to schedule the relay base station node with the predetermined value of the new data indicator (NDI) on each HARQ process by keeping a record of a previous state of each HARQ process and toggling the new data indicator (NDI) in a next downlink assignment.

25. The donor base station node of claim 17, wherein the processor is configured to make the HARQ process state in the HARQ process at one of the base station nodes known by the other base station node by providing the HARQ process executed at the donor base station node and the corresponding HARQ process executed at the relay base station node with common knowledge of HARQ process mapping and HARQ process states.

26. The donor base station node of claim 25, wherein the processor is configured to provide common information regarding at least one of:
   mapping of HARQ process number to subframe(s); and
   pre-configuration HARQ process number to post-configuration HARQ process number.

27. The donor base station node of claim 25, wherein the processor is configured to re-use pre-configuration soft information stored in HARQ buffers of the HARQ processes after the configuration.

28. The donor base station node of claim 25, wherein if a number of HARQ processes in use after the configuration is less than a number of HARQ processes in use before the configuration, the processor is configured to:
   remove downlink HARQ processes in a predetermined pattern; or
   for both uplink HARQ processes and downlink HARQ processes, prioritize removal of HARQ processes that have no pending transmission.

29. A relay base station node of a radio access network which participates in communications over a backhaul link across a radio interface with a donor base station node, the relay base station node comprising:
   a transceiver configured to receive an indication of a change in a subframe configuration pattern, the subframe configuration pattern being arranged to specify which subframe(s) of a frame structure may be utilized for the backhaul link and which subframes(s) of the frame structure may be utilized for communications between the relay base station and a wireless terminal;
   a processor configured, in response to the received indication, to make a HARQ process state in a HARQ process at one of the base station nodes known by the other base station node,
   wherein the change in the subframe configuration pattern comprises changing a number of HARQ processes in at least one of the donor base station node or the relay station node and/or changing a mapping of HARQ processes to subframes of the frame structure.

30. The relay base station node of claim 29, wherein the processor is configured to make a HARQ process state in a HARQ process at the relay base station node known by the donor base station node and/or make a HARQ process state a HARQ process at the donor base station node known by the relay base station node.

31. The relay base station node of claim 29, wherein the processor is configured to perform at least the following for making the HARQ process state in the HARQ process at one of the base station nodes known by the other base station node:
   mapping the HARQ process executed at the donor base station node and a corresponding HARQ process executed at the relay base station node to one or more subframes;
   providing a value for a HARQ process state variable to the HARQ process executed at the donor base station node and to the corresponding HARQ process executed at the relay base station node.

32. The relay base station node of claim 31, wherein the HARQ process state variable comprises a new data indicator (NDI).

33. The relay base station node of claim 29, wherein the processor is configured to perform a medium access control (MAC) reset procedure at the relay base station node for making the HARQ process state in the HARQ process at one of the base station nodes known by the other base station node.

34. The relay base station node of claim 29, wherein the processor is configured to perform at least the following to make the HARQ process state in the HARQ process at one of the base station nodes known by the other base station node:
   flushing uplink HARQ buffers in the relay base station node; and
   either:
      considering a next received transmission of a transport block as a new transmission; or
      flushing downlink HARQ buffers in the relay base station node.

35. The relay base station node of claim 34, wherein considering the next received transmission of the transport block as the new transmission comprises the processor either:
   setting a new data indicator (NDI) to a value which is toggled compared to a previously used NDI value for the transport block for the HARQ process; or
   considering the NDI to have been toggled compared to a previous transmission on the same transport block on the same HARQ process if a change in the subframe configuration pattern has occurred since the previous transmission.

36. The relay base station node of claim 29, wherein the processor is provided with common knowledge of HARQ process mapping and HARQ process states.

37. The relay base station node of claim 36, wherein the common information comprises at least one of:
   mapping of HARQ process number to subframe(s); and
   pre-configuration HARQ process number to post-configuration HARQ process number.

38. The relay base station node of claim 36, wherein the processor is configured to use pre-configuration soft information stored in HARQ buffers of the HARQ processes after the configuration.

39. The relay base station node of claim 36, wherein if a number of HARQ processes in use after the configuration is less than a number of HARQ processes in use before the configuration, the processor is further configured to:
   remove downlink HARQ processes in a predetermined pattern; or for both uplink HARQ processes and downlink HARQ processes, prioritize removal of HARQ processes that have no pending transmission.

* * * * *

UNITED STATES PATENT AND TRADEMARK OFFICE
CERTIFICATE OF CORRECTION

PATENT NO.      : 8,958,364 B2                           Page 1 of 1
APPLICATION NO. : 13/372739
DATED           : February 17, 2015
INVENTOR(S)     : Östergaard et al.

It is certified that error appears in the above-identified patent and that said Letters Patent is hereby corrected as shown below:

Title Page, in Item (57), under "ABSTRACT", in Column 2, Lines 1-2, delete "node (29)" and insert -- node (28) --, therefor.

Title Page, in Item (57), under "ABSTRACT", in Column 2, Line 3, delete "node (29)" and insert -- node (20) --, therefor.

In the Claims:

In Column 26, Line 14, in Claim 1, delete "node" and insert -- node, --, therefor.

Signed and Sealed this
Twelfth Day of July, 2016

Michelle K. Lee
*Director of the United States Patent and Trademark Office*